US008762270B1

(12) United States Patent
Evans et al.

(10) Patent No.: US 8,762,270 B1
(45) Date of Patent: Jun. 24, 2014

(54) SYSTEM AND METHOD FOR PROVIDING SUPPLEMENTAL PAYMENT OR TRANSACTION INFORMATION

(75) Inventors: Steven E. Evans, Chicago, IL (US); Suzanne Dallmeyer Pierce, Winnetka, IL (US)

(73) Assignee: JPMorgan Chase Bank, N.A., New York, NY (US)

( * ) Notice: Subject to any disclaimer, the term of this patent is extended or adjusted under 35 U.S.C. 154(b) by 854 days.

(21) Appl. No.: 12/136,500

(22) Filed: Jun. 10, 2008

Related U.S. Application Data

(60) Provisional application No. 60/955,175, filed on Aug. 10, 2007.

(51) Int. Cl.
*G06Q 40/00* (2012.01)

(52) U.S. Cl.
USPC ............... 705/40; 705/26; 705/26.1; 705/30; 705/35; 705/39; 705/45; 705/75; 379/114.14; 382/101; 455/406

(58) Field of Classification Search
USPC ............. 705/26, 26.1, 30, 35, 39, 40, 45, 75; 379/114.14; 382/101; 455/406
See application file for complete search history.

(56) References Cited

U.S. PATENT DOCUMENTS

| 3,653,480 | A | 4/1972 | Yamamoto et al. |
|---|---|---|---|
| 4,050,375 | A | 9/1977 | Orleans |
| 4,141,078 | A | 2/1979 | Bridges et al. |
| 4,205,780 | A | 6/1980 | Burns et al. |
| 4,264,808 | A | 4/1981 | Owens et al. |
| 4,321,672 | A | 3/1982 | Braun et al. |
| 4,396,985 | A | 8/1983 | Ohara |
| RE31,692 | E | 10/1984 | Tyburski et al. |
| 4,495,018 | A | 1/1985 | Vohrer |
| 4,617,457 | A | 10/1986 | Granzow et al. |
| 4,672,377 | A | 6/1987 | Murphy et al. |
| 4,694,397 | A | 9/1987 | Grant et al. |
| 4,700,055 | A | 10/1987 | Kashkashian, Jr. |

(Continued)

FOREIGN PATENT DOCUMENTS

| EP | 421808 | 4/1991 |
|---|---|---|
| EP | 1014318 | 6/2000 |

(Continued)

OTHER PUBLICATIONS

Hunt, Robert M., An Introduction to the Economics of Payment Card Networks.

(Continued)

*Primary Examiner* — Muhammad Shafi
*Assistant Examiner* — Sanjeev Malhotra
(74) *Attorney, Agent, or Firm* — Hunton & Williams LLP

(57) ABSTRACT

A system and method for providing supplemental payment or transaction information. The method comprising the steps of receiving at least one payment file from at least one payor; receiving at least one supplemental payment information file from the at least one payor or at least one provider; associating the at least one supplemental payment information file with the corresponding at least one payment file; determining whether there is a payment discrepancy based on the at least one supplemental information file and the corresponding at least one payment file; and preparing at least one payment explanation file, wherein the payment explanation file comprises data or information based on the payment file and an explanation.

21 Claims, 9 Drawing Sheets

(56) References Cited

U.S. PATENT DOCUMENTS

| | | |
|---|---|---|
| 4,713,761 A | 12/1987 | Sharpe et al. |
| 4,752,877 A | 6/1988 | Roberts et al. |
| 4,797,913 A | 1/1989 | Kaplan |
| 4,799,156 A | 1/1989 | Shavit |
| 4,807,177 A | 2/1989 | Ward |
| 4,812,628 A | 3/1989 | Boston et al. |
| 4,823,264 A | 4/1989 | Deming |
| 4,893,333 A | 1/1990 | Baran et al. |
| 4,931,793 A | 6/1990 | Fuhrmann et al. |
| 4,939,674 A | 7/1990 | Price et al. |
| 4,948,174 A | 8/1990 | Thomson et al. |
| 4,974,878 A | 12/1990 | Josephson |
| 4,975,841 A | 12/1990 | Kehnemuyi et al. |
| 4,988,849 A | 1/1991 | Sasaki |
| 4,992,646 A | 2/1991 | Collin |
| 4,992,940 A | 2/1991 | Dworkin |
| 5,023,904 A | 6/1991 | Kaplan |
| 5,053,607 A | 10/1991 | Carlson |
| 5,054,096 A | 10/1991 | Beizer |
| 5,080,748 A | 1/1992 | Bonomi |
| 5,111,395 A | 5/1992 | Smith et al. |
| 5,121,945 A | 6/1992 | Thomson et al. |
| 5,122,950 A | 6/1992 | Mee et al. |
| 5,136,502 A | 8/1992 | Van Remortel et al. |
| 5,175,682 A | 12/1992 | Higashiyama |
| 5,187,750 A | 2/1993 | Behera |
| 5,198,975 A | 3/1993 | Baker et al. |
| 5,220,501 A | 6/1993 | Lawlor |
| 5,225,978 A | 7/1993 | Peterson |
| 5,237,159 A | 8/1993 | Stephens |
| 5,265,007 A | 11/1993 | Barnhard, Jr. et al. |
| 5,283,829 A | 2/1994 | Anderson |
| 5,287,269 A | 2/1994 | Dorrough et al. |
| 5,311,594 A | 5/1994 | Penzias |
| 5,315,508 A | 5/1994 | Bain et al. |
| 5,321,238 A | 6/1994 | Watanabe et al. |
| 5,326,959 A | 7/1994 | Perazza |
| 5,336,870 A | 8/1994 | Hughes |
| 5,349,170 A | 9/1994 | Kern |
| 5,350,906 A | 9/1994 | Brody et al. |
| 5,367,581 A | 11/1994 | VanHorn et al. |
| 5,373,550 A | 12/1994 | Campbell |
| 5,396,417 A | 3/1995 | Burks et al. |
| 5,402,474 A | 3/1995 | Miller |
| 5,412,190 A | 5/1995 | Kopesec et al. |
| 5,424,938 A | 6/1995 | Wagner |
| 5,430,644 A | 7/1995 | Deaton et al. |
| 5,432,506 A | 7/1995 | Chapman |
| 5,444,794 A | 8/1995 | Uhland |
| 5,444,841 A | 8/1995 | Glasser et al. |
| 5,446,740 A | 8/1995 | Yien |
| 5,448,471 A | 9/1995 | Deaton et al. |
| 5,459,482 A | 10/1995 | Orlen |
| 5,465,206 A | 11/1995 | Hilt et al. |
| 5,477,040 A | 12/1995 | Lalonde |
| 5,479,494 A | 12/1995 | Clitherow |
| 5,483,445 A | 1/1996 | Pickering |
| 5,484,988 A | 1/1996 | Hills |
| 5,502,576 A | 3/1996 | Ramsay et al. |
| 5,504,677 A | 4/1996 | Pollin |
| 5,506,691 A | 4/1996 | Bednar et al. |
| 5,508,731 A | 4/1996 | Kohorn |
| 5,513,250 A | 4/1996 | McAllister |
| 5,532,464 A | 7/1996 | Josephson et al. |
| 5,544,043 A | 8/1996 | Miki et al. |
| 5,544,046 A | 8/1996 | Niwa |
| 5,550,734 A | 8/1996 | Tater |
| 5,551,021 A | 8/1996 | Harada |
| 5,557,515 A | 9/1996 | Abbruzzese et al. |
| 5,563,400 A | 10/1996 | Le Roux |
| 5,566,330 A | 10/1996 | Sheffield |
| 5,568,489 A | 10/1996 | Yien |
| 5,570,465 A | 10/1996 | Tsakanikas |
| 5,572,004 A | 11/1996 | Raimann |
| 5,583,759 A | 12/1996 | Geer |
| 5,583,760 A | 12/1996 | Klesse |
| 5,590,196 A | 12/1996 | Moreau |
| 5,590,197 A | 12/1996 | Chen |
| 5,592,377 A | 1/1997 | Lipkin |
| 5,592,378 A | 1/1997 | Cameron |
| 5,599,528 A | 2/1997 | Igaki |
| 5,603,025 A | 2/1997 | Tabb |
| 5,615,109 A | 3/1997 | Eder |
| 5,621,201 A | 4/1997 | Langhans |
| 5,640,577 A | 6/1997 | Scharmer |
| 5,642,419 A | 6/1997 | Rosen |
| 5,649,117 A | 7/1997 | Landry |
| 5,652,786 A | 7/1997 | Rogers |
| 5,659,165 A | 8/1997 | Jennings |
| 5,659,469 A | 8/1997 | Deaton et al. |
| 5,659,741 A | 8/1997 | Eberhardt |
| 5,666,493 A | 9/1997 | Wojcik et al. |
| 5,677,955 A | 10/1997 | Doggett et al. |
| 5,679,938 A | 10/1997 | Templeton |
| 5,679,940 A | 10/1997 | Templeton |
| 5,687,250 A | 11/1997 | Curley et al. |
| 5,692,132 A | 11/1997 | Hogan |
| 5,699,528 A | 12/1997 | Hogan |
| 5,703,344 A | 12/1997 | Bezy et al. |
| 5,704,044 A | 12/1997 | Tarter et al. |
| 5,708,422 A | 1/1998 | Blonder et al. |
| 5,715,298 A | 2/1998 | Rogers |
| 5,715,314 A | 2/1998 | Payne |
| 5,715,399 A | 2/1998 | Bezos |
| 5,717,989 A | 2/1998 | Tozzoli et al. |
| 5,724,424 A | 3/1998 | Gifford |
| 5,727,249 A | 3/1998 | Pollin |
| 5,748,780 A | 5/1998 | Stolfo |
| 5,751,842 A | 5/1998 | Eccles et al. |
| 5,757,917 A | 5/1998 | Rose et al. |
| 5,770,843 A | 6/1998 | Rose et al. |
| 5,774,553 A | 6/1998 | Rosen |
| 5,783,808 A | 7/1998 | Josephson |
| 5,784,696 A | 7/1998 | Melnikoff |
| 5,793,861 A | 8/1998 | Haigh |
| 5,794,221 A | 8/1998 | Egendorf |
| 5,802,498 A | 9/1998 | Comesanas |
| 5,802,499 A | 9/1998 | Sampson et al. |
| 5,819,236 A | 10/1998 | Josephson |
| 5,819,238 A | 10/1998 | Fernholz |
| 5,826,241 A | 10/1998 | Stein |
| 5,826,245 A | 10/1998 | Sandberg-Diment |
| 5,832,447 A | 11/1998 | Rieker |
| 5,832,460 A | 11/1998 | Bednar |
| 5,832,463 A | 11/1998 | Funk |
| 5,832,464 A | 11/1998 | Houvener et al. |
| 5,832,488 A | 11/1998 | Eberhardt |
| 5,835,580 A | 11/1998 | Fraser |
| 5,835,603 A | 11/1998 | Coutts |
| 5,835,899 A | 11/1998 | Rose et al. |
| 5,852,812 A | 12/1998 | Reeder |
| 5,859,419 A | 1/1999 | Wynn |
| 5,864,609 A | 1/1999 | Cross et al. |
| 5,870,456 A | 2/1999 | Rogers |
| 5,870,721 A | 2/1999 | Norris |
| 5,870,723 A | 2/1999 | Pare |
| 5,870,725 A | 2/1999 | Bellinger et al. |
| 5,873,072 A | 2/1999 | Kight |
| 5,878,141 A | 3/1999 | Daly et al. |
| 5,883,810 A | 3/1999 | Franklin et al. |
| 5,884,288 A | 3/1999 | Chang |
| 5,884,290 A | 3/1999 | Smorodinsky et al. |
| 5,897,625 A | 4/1999 | Gustin |
| 5,898,157 A | 4/1999 | Mangili et al. |
| 5,903,881 A | 5/1999 | Schrader |
| 5,910,896 A | 6/1999 | Hahn-Carlson |
| 5,910,988 A | 6/1999 | Ballard |
| 5,915,246 A | 6/1999 | Patterson et al. |
| 5,917,965 A | 6/1999 | Cahill et al. |
| 5,920,847 A | 7/1999 | Kolling et al. |
| 5,930,778 A | 7/1999 | Geer |
| 5,940,811 A | 8/1999 | Norris |
| 5,940,844 A | 8/1999 | Cahill et al. |
| 5,943,656 A | 8/1999 | Crooks |

(56) References Cited

U.S. PATENT DOCUMENTS

| | | | |
|---|---|---|---|
| 5,945,653 A | 8/1999 | Walker et al. |
| 5,956,700 A | 9/1999 | Landry |
| 5,963,659 A | 10/1999 | Cahill et al. |
| 5,963,925 A | 10/1999 | Kolling et al. |
| 5,966,698 A | 10/1999 | Pollin |
| 5,978,780 A | 11/1999 | Watson |
| 5,987,435 A | 11/1999 | Weiss et al. |
| 5,987,436 A | 11/1999 | Halbrook |
| 5,987,439 A | 11/1999 | Gustin et al. |
| 5,991,750 A | 11/1999 | Watson |
| 6,000,832 A | 12/1999 | Franklin et al. |
| 6,003,762 A | 12/1999 | Hayashida |
| 6,006,208 A | 12/1999 | Forst et al. |
| 6,009,442 A | 12/1999 | Chen et al. |
| 6,014,636 A | 1/2000 | Reeder |
| 6,016,482 A | 1/2000 | Molinari et al. |
| 6,016,484 A | 1/2000 | Williams et al. |
| 6,018,718 A | 1/2000 | Walker et al. |
| 6,026,388 A | 2/2000 | Liddy et al. |
| 6,029,139 A | 2/2000 | Cunningham et al. |
| 6,032,133 A | 2/2000 | Hilt et al. |
| 6,032,137 A | 2/2000 | Hallard |
| 6,035,281 A | 3/2000 | Crosskey et al. |
| 6,035,285 A | 3/2000 | Schlect et al. |
| 6,035,287 A | 3/2000 | Stallaert et al. |
| 6,038,553 A | 3/2000 | Hyde, Jr. |
| 6,041,312 A | 3/2000 | Bickerton et al. |
| 6,041,315 A | 3/2000 | Pollin |
| 6,044,362 A | 3/2000 | Neely |
| 6,045,039 A | 4/2000 | Stinson et al. |
| 6,047,261 A | 4/2000 | Siefert |
| 6,052,674 A | 4/2000 | Zervides et al. |
| 6,058,380 A | 5/2000 | Anderson et al. |
| 6,058,381 A | 5/2000 | Nelson |
| 6,061,665 A | 5/2000 | Bahreman |
| 6,064,764 A | 5/2000 | Bhaskaran et al. |
| 6,064,987 A | 5/2000 | Walker et al. |
| 6,065,675 A | 5/2000 | Teicher |
| 6,067,524 A | 5/2000 | Byerly et al. |
| 6,070,150 A | 5/2000 | Remington et al. |
| 6,070,798 A | 6/2000 | Nethery |
| 6,073,104 A | 6/2000 | Field |
| 6,073,113 A | 6/2000 | Guinan |
| 6,076,072 A | 6/2000 | Libman |
| 6,078,907 A | 6/2000 | Lamm |
| 6,081,790 A | 6/2000 | Rosen |
| 6,085,168 A | 7/2000 | Mori et al. |
| 6,088,683 A | 7/2000 | Jalili |
| 6,088,685 A | 7/2000 | Kiron et al. |
| 6,088,686 A | 7/2000 | Walker et al. |
| 6,092,056 A | 7/2000 | Tull, Jr. et al. |
| 6,098,053 A | 8/2000 | Slater |
| 6,098,070 A | 8/2000 | Maxwell |
| 6,105,011 A | 8/2000 | Morrison, Jr. |
| 6,108,639 A | 8/2000 | Walker et al. |
| 6,110,044 A | 8/2000 | Stern |
| 6,111,858 A | 8/2000 | Greaves et al. |
| 6,115,690 A | 9/2000 | Wong |
| 6,119,106 A | 9/2000 | Mersky et al. |
| 6,119,107 A | 9/2000 | Polk |
| 6,125,354 A | 9/2000 | MacFarlane et al. |
| 6,128,602 A | 10/2000 | Northington et al. |
| 6,128,603 A * | 10/2000 | Dent et al. ............ 705/40 |
| 6,129,273 A | 10/2000 | Shah |
| 6,138,118 A | 10/2000 | Koppstein et al. |
| 6,144,946 A | 11/2000 | Iwamura |
| 6,148,293 A | 11/2000 | King |
| 6,149,055 A | 11/2000 | Gatto |
| 6,149,056 A | 11/2000 | Stinson et al. |
| 6,173,272 B1 | 1/2001 | Thomas et al. |
| 6,181,837 B1 | 1/2001 | Cahill et al. |
| 6,185,544 B1 | 2/2001 | Sakamoto et al. |
| 6,202,054 B1 | 3/2001 | Lawlor et al. |
| 6,205,433 B1 | 3/2001 | Boesch et al. |
| 6,213,391 B1 | 4/2001 | Lewis |
| 6,227,447 B1 | 5/2001 | Campisano |
| 6,233,565 B1 | 5/2001 | Lewis et al. |
| 6,233,566 B1 | 5/2001 | Levine et al. |
| 6,236,972 B1 | 5/2001 | Shkedy |
| 6,240,444 B1 | 5/2001 | Fin et al. |
| 6,278,981 B1 | 8/2001 | Dembo et al. |
| 6,289,322 B1 | 9/2001 | Kitchen et al. |
| 6,292,789 B1 | 9/2001 | Schutzer |
| 6,301,379 B1 | 10/2001 | Thompson et al. |
| 6,301,567 B1 | 10/2001 | Leong et al. |
| 6,304,858 B1 | 10/2001 | Mosler et al. |
| 6,321,212 B1 | 11/2001 | Lange |
| 6,324,524 B1 | 11/2001 | Lent et al. |
| 6,338,047 B1 | 1/2002 | Wallman |
| 6,338,049 B1 | 1/2002 | Walker et al. |
| 6,343,279 B1 | 1/2002 | Bissonette et al. |
| 6,363,164 B1 | 3/2002 | Jones et al. |
| 6,363,364 B1 | 3/2002 | Nel |
| 6,363,365 B1 | 3/2002 | Kou |
| 6,366,967 B1 | 4/2002 | Wagner |
| 6,374,235 B1 | 4/2002 | Chen et al. |
| 6,390,362 B1 | 5/2002 | Martin |
| 6,393,409 B2 | 5/2002 | Young et al. |
| 6,405,173 B1 | 6/2002 | Honarvar et al. |
| 6,415,259 B1 | 7/2002 | Wolfinger et al. |
| 6,418,419 B1 | 7/2002 | Nieboer et al. |
| 6,418,420 B1 | 7/2002 | DiGiorgio et al. |
| 6,418,430 B1 | 7/2002 | DeFazio et al. |
| 6,434,159 B1 | 8/2002 | Woodward et al. |
| 6,446,072 B1 | 9/2002 | Schulze et al. |
| 6,460,020 B1 | 10/2002 | Pool et al. |
| 6,490,568 B1 | 12/2002 | Omara et al. |
| 6,493,685 B1 | 12/2002 | Ensel et al. |
| 6,535,896 B2 | 3/2003 | Britton et al. |
| 6,536,663 B1 | 3/2003 | Lozier et al. |
| 6,554,185 B1 | 4/2003 | Montross et al. |
| 6,574,350 B1 | 6/2003 | Rhoads et al. |
| 6,574,377 B1 | 6/2003 | Cahill et al. |
| 6,578,000 B1 | 6/2003 | Dodrill et al. |
| 6,578,015 B1 | 6/2003 | Haseltine et al. |
| 6,609,113 B1 | 8/2003 | O'Leary et al. |
| 6,609,125 B1 | 8/2003 | Layne et al. |
| 6,629,081 B1 | 9/2003 | Cornelius et al. |
| 6,636,615 B1 | 10/2003 | Rhoads et al. |
| 6,658,393 B1 | 12/2003 | Basch et al. |
| 6,661,910 B2 | 12/2003 | Jones et al. |
| 6,704,714 B1 | 3/2004 | O'Leary et al. |
| 6,721,715 B2 | 4/2004 | Nemzow |
| 6,728,397 B2 | 4/2004 | McNeal |
| 6,820,058 B2 | 11/2004 | Wood et al. |
| 6,825,940 B1 | 11/2004 | Wu et al. |
| 6,860,375 B2 | 3/2005 | Hallowell et al. |
| 6,954,896 B1 | 10/2005 | Dodrill et al. |
| 6,965,882 B1 | 11/2005 | Lapstun et al. |
| 6,970,259 B1 | 11/2005 | Lunt et al. |
| 6,970,855 B2 | 11/2005 | Das et al. |
| RE38,957 E | 1/2006 | Laussermair et al. |
| 7,004,382 B2 | 2/2006 | Sandru |
| 7,062,456 B1 | 6/2006 | Riehl et al. |
| 7,068,832 B1 | 6/2006 | Price et al. |
| 7,104,443 B1 | 9/2006 | Paul et al. |
| 7,133,846 B1 | 11/2006 | Ginter et al. |
| 7,177,836 B1 | 2/2007 | German et al. |
| 7,200,255 B2 | 4/2007 | Jones et al. |
| 7,313,543 B1 | 12/2007 | Crane et al. |
| 7,317,823 B1 | 1/2008 | Price et al. |
| 7,337,148 B2 | 2/2008 | Xie et al. |
| 7,349,884 B1 | 3/2008 | Odom et al. |
| 7,380,707 B1 | 6/2008 | Fredman |
| 7,401,048 B2 | 7/2008 | Rosedale et al. |
| 7,640,190 B1 * | 12/2009 | Sullivan et al. ............ 705/26.1 |
| 7,664,689 B1 * | 2/2010 | Rosenfield et al. ............ 705/35 |
| 2001/0011222 A1 | 8/2001 | McLauchlin et al. |
| 2001/0018666 A1 | 8/2001 | Sugiyama et al. |
| 2001/0018739 A1 | 8/2001 | Anderson et al. |
| 2001/0032139 A1 | 10/2001 | Debonnett, Jr. |
| 2001/0037300 A1 | 11/2001 | Miyazaki et al. |
| 2001/0037309 A1 | 11/2001 | St. Vrain |
| 2001/0047334 A1 | 11/2001 | Nappe et al. |

(56) References Cited

U.S. PATENT DOCUMENTS

| | | |
|---|---|---|
| 2001/0047489 A1 | 11/2001 | Ito et al. |
| 2001/0051533 A1 | 12/2001 | Wietzke et al. |
| 2002/0012445 A1 | 1/2002 | Perry |
| 2002/0013728 A1 | 1/2002 | Wilkman |
| 2002/0023055 A1* | 2/2002 | Antognini et al. ............... 705/40 |
| 2002/0026394 A1 | 2/2002 | Savage et al. |
| 2002/0038363 A1 | 3/2002 | MacLean |
| 2002/0046169 A1 | 4/2002 | Keresman, III et al. |
| 2002/0052842 A1 | 5/2002 | Schuba et al. |
| 2002/0055907 A1 | 5/2002 | Pater et al. |
| 2002/0069134 A1 | 6/2002 | Solomon |
| 2002/0072976 A1 | 6/2002 | Virtanen et al. |
| 2002/0077978 A1 | 6/2002 | O'Leary et al. |
| 2002/0082985 A1 | 6/2002 | MacKay |
| 2002/0087415 A1 | 7/2002 | Allen et al. |
| 2002/0087468 A1 | 7/2002 | Ganesan et al. |
| 2002/0087469 A1 | 7/2002 | Ganesan et al. |
| 2002/0091635 A1 | 7/2002 | Dilip et al. |
| 2002/0100803 A1 | 8/2002 | Sehr |
| 2002/0107770 A1 | 8/2002 | Meyer et al. |
| 2002/0107788 A1 | 8/2002 | Cunningham |
| 2002/0107794 A1* | 8/2002 | Furphy et al. .................... 705/40 |
| 2002/0111837 A1 | 8/2002 | Aupperle |
| 2002/0128981 A1 | 9/2002 | Kawan et al. |
| 2002/0138398 A1 | 9/2002 | Kalin et al. |
| 2002/0138426 A1* | 9/2002 | Craddick ......................... 705/40 |
| 2002/0169658 A1 | 11/2002 | Adler |
| 2002/0170966 A1 | 11/2002 | Hannigan et al. |
| 2002/0178071 A1 | 11/2002 | Walker et al. |
| 2002/0184151 A1 | 12/2002 | Maloney |
| 2002/0194096 A1 | 12/2002 | Falcone et al. |
| 2002/0198817 A1 | 12/2002 | Dhir |
| 2002/0199182 A1 | 12/2002 | Whitehead |
| 2003/0018557 A1 | 1/2003 | Gilbert et al. |
| 2003/0037002 A1 | 2/2003 | Higgins et al. |
| 2003/0040959 A1 | 2/2003 | Fei et al. |
| 2003/0046218 A1 | 3/2003 | Albanese et al. |
| 2003/0055675 A1 | 3/2003 | Klein Twennaar |
| 2003/0069780 A1 | 4/2003 | Hailwood et al. |
| 2003/0097335 A1 | 5/2003 | Muskowitz et al. |
| 2003/0105641 A1 | 6/2003 | Lewis |
| 2003/0110442 A1 | 6/2003 | Battle |
| 2003/0120686 A1 | 6/2003 | Kim et al. |
| 2003/0130945 A1 | 7/2003 | Force et al. |
| 2003/0130952 A1 | 7/2003 | Bell et al. |
| 2003/0144942 A1 | 7/2003 | Sobek |
| 2003/0187789 A1 | 10/2003 | Karas et al. |
| 2003/0191710 A1* | 10/2003 | Green et al. ..................... 705/40 |
| 2003/0200107 A1 | 10/2003 | Allen et al. |
| 2003/0208421 A1 | 11/2003 | Vicknair et al. |
| 2003/0208441 A1 | 11/2003 | Poplawski et al. |
| 2003/0225663 A1 | 12/2003 | Horan et al. |
| 2003/0233305 A1 | 12/2003 | Solomon |
| 2003/0233321 A1* | 12/2003 | Scolini et al. .................... 705/40 |
| 2003/0237046 A1 | 12/2003 | Parker et al. |
| 2004/0064375 A1* | 4/2004 | Randell et al. ................... 705/26 |
| 2004/0064409 A1* | 4/2004 | Kight et al. ...................... 705/40 |
| 2004/0078328 A1 | 4/2004 | Talbert et al. |
| 2004/0128245 A1* | 7/2004 | Neal et al. ........................ 705/40 |
| 2004/0133516 A1 | 7/2004 | Buchanan et al. |
| 2004/0181493 A1* | 9/2004 | Cross et al. ...................... 705/75 |
| 2004/0201735 A1 | 10/2004 | Baron |
| 2004/0203585 A1* | 10/2004 | Wills et al. ..................... 455/406 |
| 2004/0228514 A1 | 11/2004 | Houle et al. |
| 2005/0033690 A1 | 2/2005 | Antognini et al. |
| 2005/0055254 A1 | 3/2005 | Schmidtberg et al. |
| 2005/0075941 A1* | 4/2005 | Jetter et al. ...................... 705/26 |
| 2005/0086178 A1 | 4/2005 | Xie et al. |
| 2005/0091156 A1 | 4/2005 | Hailwood et al. |
| 2005/0097050 A1 | 5/2005 | Orcutt |
| 2005/0144059 A1 | 6/2005 | Schuessler |
| 2005/0149415 A1* | 7/2005 | Furphy et al. .................... 705/30 |
| 2005/0152520 A1* | 7/2005 | Logue ...................... 379/114.14 |
| 2005/0177480 A1 | 8/2005 | Huang |
| 2005/0209954 A1 | 9/2005 | Asher et al. |
| 2005/0261955 A1 | 11/2005 | Humble et al. |
| 2006/0106650 A1 | 5/2006 | Bush |
| 2006/0106717 A1 | 5/2006 | Randle et al. |
| 2006/0136335 A1 | 6/2006 | Ferguson, III |
| 2006/0178986 A1 | 8/2006 | Giordano et al. |
| 2006/0206427 A1 | 9/2006 | Love et al. |
| 2006/0282389 A1 | 12/2006 | Gupte |
| 2006/0287953 A1 | 12/2006 | Chauhan |
| 2007/0038561 A1* | 2/2007 | Vancini et al. ................... 705/39 |
| 2007/0110277 A1* | 5/2007 | Hayduchok et al. .......... 382/101 |
| 2007/0271183 A1* | 11/2007 | Foth ................................ 705/45 |
| 2008/0040249 A1* | 2/2008 | Re et al. .......................... 705/35 |
| 2008/0193008 A1 | 8/2008 | Mount et al. |

FOREIGN PATENT DOCUMENTS

| | | |
|---|---|---|
| WO | WO 91/16691 | 10/1991 |
| WO | WO 93/08545 | 4/1993 |
| WO | WO 94/28497 | 12/1994 |
| WO | WO 96/08783 | 3/1996 |
| WO | WO 96/12242 A1 | 4/1996 |
| WO | WO 97/14108 | 4/1997 |
| WO | WO 97/45796 | 12/1997 |
| WO | WO 97/45814 | 12/1997 |
| WO | WO 98/09260 | 3/1998 |
| WO | WO 99/10823 | 3/1999 |
| WO | WO 00/39979 | 7/2000 |
| WO | WO 01/75730 A2 | 10/2001 |
| WO | WO 02/063432 A2 | 8/2002 |
| WO | WO 2004/079603 | 9/2004 |

OTHER PUBLICATIONS

Annual Report Pursuant to Sectin 13 or 15(d) of The Securities Exchange Act of 1934, Form 10-K, Intelidata Technologies Corporation, Fiscal Year Ended Dec. 31, 2001.

Blockbuster running test of a stored value card, The American Banker, Sep. 1, 1995.

CES/NaBANCO introduces stored value card technology blockbuster video is first merchant partner, Business Wire, Inc., Jan. 15, 1996.

Card Flash Daily Payment Card News, www.cardweb.com, printed Sep. 23, 2004.

Anonymous, Chase Manhattan introduces new FEDI payables product, ProQuest document ID: 7806951, ISSN/ISBN: 02686635, May 1995.

Bills, Chase Pact Done, What's Next for Web Vendors?, The American Banker, Technology Section, Jun. 3, 2002, p. 23.

Reinbach, Chase steps up treasury system, ProQuest documednt ID 8723558, ISSN/ISBN: 10459472, Nov. 1995.

Anonymous, Chasing the global trend, Cash Management News, proQuest document ID 9319923, ISSN/ISBN: 02686635, Dec. 1995.

Malhotra, Clearing House Enumerates e-Payments IIIs, The American Banker, vol. 167, No. 154, Aug. 23, 2002.

Marjanovic, Corporate Services: Chase Gears Up Global Payments System Series: 16, The American Banker, vol. 160, Issue 174, Sep. 11, 1995, p. 41.

Gluck, Creating a Global Cash-Management Game Plan, Bank Systems & Technology, Feb. 1997, p. 28.

Lamond, Credit Card Transactions Real World and Online, Paying by Credit Card-Real World and Online, http://www.virtualschool.edu/mon/ElectronicProperty/klamond/credit, printed Jul. 8, 2005, 17 pages.

Lamond, Keith, Credit Card Transactions Real World and Online, http://www.virtualschool.edu/mon/ElectronicProperty/klamond/credit_card.htm, pp. 1-17, printed Jul. 8, 2005.

Dialog file 20, #10279554; Offer: Book Yourself Free Cassettes; Mar. 25, 2000; Birmingham Post, p. 16.

Du Pont's Electronic Payments, Corporate EFT Report, v9, n1, Dialog file 636, Accession No. 01066902, Jan. 11, 1989.

Carreker, Electronic check presentment: Capturing new technology, http://proquest.umi.com, Banking Management, Rolling Meadows: vol. 71, Issue 2, Mar./Apr. 1995, p. 32, 5 pages.

Fidelity Helps Fund Sellers Trim the Taxes They'll Owe, The Wall Street Journal, Nov. 7, 2002.

(56) References Cited

OTHER PUBLICATIONS

First Data markets stored-value cards, Cards International, Jan. 30, 1996, p. 5.
Norris, First data unit develops blockbuster cash card, Omaha World Hearld Sunrise Edition, Business Section, Jan. 19, 1996, p. 16.
Harsh Truth: Your Investments Likely Won't Make Any Money. Money, Initial Launch to 200 Credit Unions, USA Today.com, Jun. 27, 2002.
DECOVNY, Net Scope, Banking Technology, May 1997.
Nokia Announces the World's First NFC Enabled Mobile Product for Contactless Payment and Ticketing, PRNewswire, Feb. 9, 2005.
Armstrong, Douglas, Norwest eases difficulty of Interstate banking Bank's customers may use the same account number at any branch.
Goode, On Profit, Loss and the Mysteries of the Mind, The New York Times, Nov. 5, 2002.
Anonymous, Operating in a multi-currency environment, ProQuest document ID 9215937, ISSN/ISBN 09589309, Oct. 1995.
Maher and Troutman, Payor's Prescription for Painless Migration to Electronic Healthcare Payments and Remittance Advices, PNC Bank, Dec. 2001.
Maturi, Richard, Personal Finance; When you Need to Send Cash in a Flash.
Press Release, Mar. 5, 2004, Payment Data Systems Files Patent on Debit Card Payment Solution, American City Business Journals, Inc., Mar. 5, 2004.
Maher and Troutman, Provider's Prescription for Painless Migration to Receipt of Electronic Healthcare Payments and Remittance Advices, PNC Bank, Dec. 2001.
Anonymous, Systems spell change for foreign exchange, Global Investor, ProQuest document ID 1056152B, ISSN/ISBN: 09513604, Nov. 1996.
French, Tech Stocks: Market Movers, Investors Worry CheckFree Being Chased from Its Own Game, http://www.thestreet.com, Jun. 20, 2002.
Technology, in Brief Wachovia-InteliData Deal, May 7, 2002.
Zuckerman, The Hedge-Fund Craze, The Wall Street Journal, Jun. 12, 2002.
McDonald, The Stars in the Sky Flicker, and Fund Stars Do the Same, The Wall Street Journal, Jan. 15, 2003.
Anonymous, Visa & Carnegie Mellon Plan Online Payment Scheme, Newsbyte News Network, Feb. 15, 1995.
Financial News, Wells Fargo Rolls Out Nationwide Lockbox Check Conversion, PR Newswire Association, Apr. 22, 2003.
Terrie Miller and Henry Yan, When Custody Governs, Benefits Canada, Toronto, Feb. 1998, vol. 22, Issue 2, p. 33, 5 pages.

\* cited by examiner

SYSTEM AND METHOD FOR PROVIDING SUPPLEMENTAL PAYMENT OR TRANSACTION INFORMATION

RELATED APPLICATIONS

This application claims the benefit of U.S. Provisional Application Ser. No. 60/955,175, filed on Aug. 10, 2007 and titled "System and Method for Providing Supplemental Payment Information."

FIELD OF THE INVENTION

The present invention relates to systems and methods for providing supplemental payment, transaction or any other type of information. More particularly, the present invention relates to systems and methods that enable customers of a financial institution, for example, to receive supplemental payment or transaction information relating to payments or other transactions associated with their account(s).

BACKGROUND

Increasingly, financial transactions are being made electronically with the help of devices and methods, such as, for example, credit cards, debit cards, stored value cards and direct deposit that enable the quick and convenient transmission and posting of funds to and from designated accounts. Typically, account statements are provided to the customer (electronic or hardcopy format) which list all transactions that occurred in a corresponding account during a specified period of time. For example, a bank or other financial institution may provide a customer with a monthly statement that indicates all transactions that occurred on the customer's checking/savings account or credit card, for example, during the previous month.

Unfortunately, current statements provide little information to the customer on the particular transactions. This is particularly the case when a customer receives a payment or deposit that is posted to the customer's account. For example, if the customer's employer deposits into the customer's account a paycheck through direct deposit, all the customer would be able to see in the account statement is the dollar amount and date of the deposit, and, in some cases, the identity of the payor (e.g., the customer's employer). Thus, if the customer notices that the payment amount is less (or more) than expected, the customer will have to contact the employer to resolve the matter.

Thus, what is needed is a system and method that provides supplemental, detailed, additional or expanded information ("supplemental information") on account transactions, such as, for example, the supporting details of a particular payment or transaction as well as any particular or customized messages that rules or parameters may determine need to be displayed to an account holder or group of account holders. For example, if a cardholder was entitled to a $500 deposit, but only $100 was actually deposited, the cardholder may be provided with an explanation that the missing $400 was deducted as a result of back taxes, past due amounts, etc. Supplemental information may comprise information of any kind or type, and is not limited to financial or transaction information.

SUMMARY OF THE INVENTION

According to various embodiments, the systems and methods described herein may provide supplemental payment or other transaction information in connection with payments or transactions made to or from an account or user. For example, if an employer is depositing an employee's paycheck into the employee's savings account through direct deposit, the systems and methods described herein may provide supplemental payment information that appears on the employee's account statement (online or hardcopy) and explains particulars on the amount being deposited, such as, for example, why the amount is less (or more) than is customarily received by the employee. Supplemental information on other types of transactions is possible. For example, a customer's purchase of jewelry may result in supplemental information being provided to the customer, such as, for example, a detailed description of the jewelry purchased, the precise time the purchase was made, the location of the purchase, who the sales person was that assisted the customer, as well as any other information that may assist the customer in appreciating the transaction when it is viewed. Other forms of supplemental payment or transaction information is possible. In some embodiments, the systems and methods described herein may receive transaction particulars and supplemental payment or transaction information (SPI) from any number of individuals or entities and coordinate such information into detailed explanations that inform an account holder, for example, about the activities occurring on the account holder's account. In some embodiments, the various systems and methods described herein may reconcile payments and transactions received from any number of payors, merchants or providers, for example, and provide the account-holder with information explaining the reconciliation and any disparity between the amount of money the account-holder expected to receive and what was actually deposited or posted to his account.

In some embodiments, supplemental payment or transaction information may be based on information provided by the individual or entity initiating the transaction (e.g., making the payment or deposit), while in some embodiments, the information is based on the information provided by a third party, the administrator of the account to which the payment is being posted, the administrator of the systems and methods described herein, or any other individual or entity that may provide data or information relevant to the payment, deposit or other transaction, or which may be used to identify relevant supplemental payment or transaction information. In some embodiments, the supplemental information may be provided electronically or in hardcopy form, such as, for example, with or as part of an account statement provided to or made available to the account holder.

In some embodiments, the systems and methods described herein may provide supporting payment or transaction details for Automated Clearing House (ACH) deposit or transaction files made to a card or account holder on behalf of a payor, such as, for example, an individual, private entity, or government agency. In addition to payment or deposit particulars, these ACH deposit or transaction files may contain supplemental information (e.g., payment information or other type of information or message) for a given account or account holder or group of accounts or account holders. In some embodiments, supplemental information may be received separate from an ACH file or other file via supplemental payment information files from the payor or third party providers, for example. In some embodiments, a bulk file may contain information directed to a single account holder or directed to any number of account holders. For example, a broadcast message transmitted via a bulk file may contain information to be delivered to all account holders, or to only one or select account holders. Thus, if a plurality of invoices are received from a single payee, the corresponding bulk file to the payee may contain information or details on each of the invoices received. Similarly, if multiple payments to multiple payees is contemplated, the corresponding bulk file may contain particular information corresponding to each of the payments, such that each payee receives only that information which relates to its transaction.

According to some embodiments, supplemental payment or transaction information may be provided by a supplemental payment information processing station that, in some embodiments, may serve as an intermediary between two parties to a transaction, such as, for example, a payor/provider and a payee. The payor/provider may comprise any individual or entity that is initiating or is part of a transaction on an account, such as, for example, transferring or posting funds to an account, or that has a claim against the payee or account holder. In some embodiments, the supplemental payment information processing station may receive payments or other transactions to be posted to or from the payee's account, for example, and associate such payments or other transactions with corresponding supplemental payment information received from the payor/provider or any other individual or entity. In some embodiments, the supplemental payment information processing station may communicate such additional or supplemental payment information relating to the payment, such as, for example, the dollar amount, back taxes, why that amount, etc. In some embodiments, supplemental payment information processing station may capture the additional or supplemental information on the back-end in batch mode and convert the information into a statement that may be displayed or made available to the corresponding account holders over a communications network, such as the Internet, for example. In some embodiments, the systems and methods described herein may provide an account holder, for example, with a particular web address that upon initiation takes the account holder to an online statement or other interface which presents the supplement information. The information may also be incorporated into the monthly (or other periodic, random, or predetermined) payment cycle so that account holders may receive a mailed version (hardcopy or electronic) of the statement. In some embodiments, the systems and methods described herein may provide an immediate message to the account, whether electronic, hardcopy or otherwise. In some embodiments, supplemental information may be provided to the account holder, for example, via phone (e.g., cell or land line), text message, email, or any other form of communication. For example, an unemployment insurance agency utilizing the systems and methods described herein may broadcast messages to beneficiaries announcing an upcoming job fair. Such message may be transmitted as a textual presentation or message (e.g., a pdf document), a video or audio presentation, or other form of viable communication.

In some embodiments, supplemental payment information processing station may assess the supplemental information and data and implement quality check (QC) procedures to ensure that accurate and complete information is passed to the account holder. In some embodiments, the various systems and methods may ensure, for example, that payment information and supplement information match up. For example, if an ACH payment file with an employee's paycheck is transmitted, but is less (or more) than the usual amount received, the systems and methods described may determine that an amount was subtracted or added either because of a personal charge or reimbursement that is being made to the account. In some embodiments, the systems and methods described herein may correlate supplemental information with corresponding payment files, transaction files. In some embodiments, the various systems and methods described herein may translate a message into an appropriate language preferred by the intended recipient(s). In addition, supplemental payment information processing station may periodically (e.g., daily) receive numerous files, which can be matched in pairs. For example, a file containing payment, deposit, withdrawal or other transaction information (e.g., an ACH file, EDI file, debit adjustment file, credit adjustment file, or a file corresponding to an in-person transaction (e.g., deposit or withdrawal at a bank branch or ATM)) may be matched with a separate file containing supplemental information. Additional files and information may be received from other sources and incorporated into the data presented to the account holder. For example, data from federal agencies (e.g., IRS), state agencies (e.g., unemployment insurance, workers compensation, child care and alimony payments), or any other individual or entity, private or public. Supplemental payment information may be specific to an account holder, or for any number of account holders.

In some embodiments, supplemental payment or transaction information may be presented in a customized and specific manner depending on the account holder or payor. In some embodiments, supplemental payment information may also be made available to customer service representatives (CSRs) so that they can assist account holders as needed.

In some embodiments, supplemental information may be provided even if there is no corresponding payment that is being made or received. For example, the various systems and methods described herein may permit the provision of supplemental information corresponding to any transaction, such as a return, reward redemption, withdrawal, or an other activity or behavior that may comprise a transaction. Thus, the various systems and methods described herein may be used to broadcast messages or information to any number of accounts, individuals, entities or other types of designated recipients.

In addition, in some embodiments, the various systems and methods described herein may permit the recipient of supplemental information to communicate back with the provider of the supplemental information. For example, a customer receiving supplemental information relating to a particular purchase may transmit a message to the provider of the supplemental information, the merchant from whom the purchase was made, or any other appropriate individual or entity associated with the supplement information. In some embodiments, such message may be transmitted using the systems and methods described herein.

According to one embodiment of the system and methods described herein, a method for providing supplemental payment information is provided. The method comprising: receiving at least one payment file from at least one payor; receiving at least one supplemental payment information file from the at least one payor or at least one provider; associating the at least one supplemental payment information file with the corresponding at least one payment file; determining whether there is a payment discrepancy based on the at least one supplemental information file and the corresponding at least one payment file; and preparing at least one payment explanation file, wherein the payment explanation file comprises data or information based on the payment file and an explanation.

In another embodiment of the systems and methods described herein, a system for providing supplemental payment information is provided. The system comprising: a payment processor or module for receiving at least one payment file from at least one payor; a supplemental information processor or module for receiving at least one supplemental payment information file from the at least one payor or at least one provider; an association processor or module for associating the at least one supplemental payment information file with the corresponding at least one payment file; a discrepancy determination processor or module for determining whether there is a payment discrepancy based on the at least one supplemental information file and the corresponding at least one payment file; and an explanation processor or module for preparing at least one payment explanation file, wherein the payment explanation file comprises data or information based on the payment file and an explanation.

In yet another embodiment of the systems and methods described herein, a method for providing supplemental payment information is provided. The method comprising: receiving at least one payment; associating each of the at least one payment to an account or user; receiving at least one supplemental payment or transaction information; associating each of the at least one supplemental payment or transaction information file with an account or user; determining, for each account or user, a total payment; generating a statement explaining the total payment, wherein the statement comprises data or information compiled from the at least one supplemental payment or transaction information; and providing the statement to the user.

Other embodiments may also be considered.

DETAILED DESCRIPTION OF EXEMPLARY EMBODIMENTS

Figure 1:
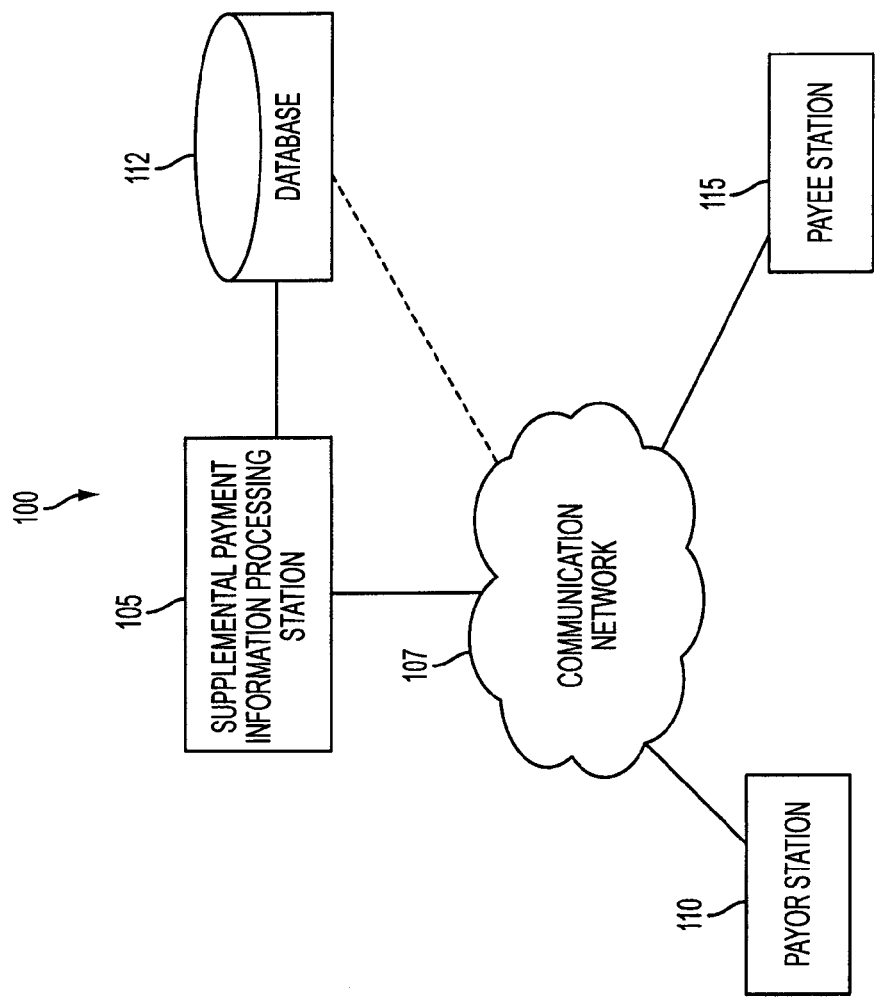
FIG. 1 shows an exemplary system 100 for providing supplemental payment or transaction information, according to various embodiments of the invention.

Reference will now be made to the present preferred embodiments of the invention, examples of which are illustrated in the accompanying drawings in which like reference characters refer to corresponding elements.

While the exemplary embodiments illustrated herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

FIG. 1 illustrates a system 100 for providing supplemental payment or transaction information, according to an embodiment of the invention. System 100 may comprise a supplemental payment or transaction information processing station 105 for providing supplemental payment or transaction information to any number of account holder, through whose account transactions are processed. As used herein, the term "account holder" may refer to any account(s) (e.g., actual or ledger), individual(s) or entity(ies) that may receive supplemental information as described herein. In some embodiments, the supplemental payment or transaction information may be provided by system 100 to at least one user, such as a payment, account holder, card holder, or any other individual or entity associated with an account on which a payment or other transaction is made. In some embodiments, payments or transactions may be posted to an account(s) based upon direction of a payor, for example, or dynamically based on any data or information that may readily be used to determine appropriate accounts to which a payment or other transaction should be posted. In some embodiments, supplemental payment or transaction information processing station 105 may be administered by a bank or other financial institution that issues or administers accounts, a merchant or vendor that may initiate or issue payments or other transactions associated with an account, or any individual, entity or third party that accepts, coordinates, manages or administers the posting of payments or other transactions to or from accounts.

In some embodiments, supplemental payment or transaction information processing station 105 may maintain or have access to particulars about customers, accounts, payments or transactions, merchants, payors, payees, and any data and information that may be used to provide supplement payment or transaction information, according to the systems and methods described herein. In some embodiments, supplemental payment or transaction information processing station 105 may comprise a central headquarters or distributed network or repository of the various features and functions of the systems and methods described herein, and may be maintained by or in conjunction with any party or entity that administers the coordination of data and information in connection with the processing of transactions according to the systems and methods described herein.

Supplemental payment or transaction information processing station 105 may comprise a single server or engine (as shown). In some embodiments, supplemental payment or transaction information processing station 105 may comprise a plurality of servers or engines, dedicated or otherwise, which may further host modules for performing desired system functionality. Supplemental payment or transaction information processing station 105, for example, may host one or more applications or modules that function to permit interaction between the users of system 100 (e.g., card or account holders, customers, merchants, payors, payees, the administrator of supplemental payment or transaction information processing station 105, and any other relevant parties) as it relates to exchanging and processing of data and information related to the provision of supplement information as described herein, for example. For instance, supplemental payment or transaction information processing station 105 may include an administration module that serves to permit interaction between the system 100 and the individual(s) or entity(ies) charged with administering system 100 or supplemental payment or transaction information processing station 105. Such an administration module may enable the agent of supplemental payment or transaction information processing station 105, for example, to input information related to account, account holders, direct deposit information, transaction types, account categories, customer or employee information. In some embodiments, supplemental payment or transaction information processing station 105 may also host or access rules and parameters used to determine accounts to which a particular payment(s) or transaction(s) should be posted, or to which account(s) particular supplemental information should be provided. Such rules and parameters may comprise variables that define, for example, a particular type or pool of transactions that are eligible to be processed by a particular account or accounts, or the identity of account holder(s) to which supplemental information should be provided. Thus, if an employer depositing paychecks into its employees accounts through direct deposit wants to provide explanations of the amounts being deposited, the systems and methods described herein may provide such supplemental information to the appropriate employee(s). Other examples are of course possible.

According to various embodiments, an agent of supplemental payment or transaction information processing station 105 may interface with a graphical user interface (or GUI) to input, among other things: (1) data or information (e.g., terms, words, phrases, or digits) that enable the systems and methods described herein to process transactions and designate accounts to which transactions should be posted or to which accounts supplemental information should be provided, (2) data or information that enable the systems and methods described herein to receive account holder designations that specify desired statement preferences or formats, (3) data or information that enable the systems and methods described herein to generate or receive and process transaction information or supplemental information provided by any individual or entity; (4) generate and provide or make available statements that include supplement payment or transaction information; and (5) input rules, parameters and algorithms used to determine the processing and providing of supplement payment or transaction information. An agent of supplemental payment or transaction information processing station 105 may also input information or data regarding how customers, account holders, payees, transactions, transaction devices (e.g., credit card, debit card, etc.), merchants, payors, accounts, supplemental payment or transaction information, products or services, or any other data or information that may be used by the systems and methods described herein are stored (e.g., categorized) in a database 112, for example. Other modules may permit processing of the various features and functionality described herein for processing transactions (See FIG. 4 for modules associated with supplemental payment or transaction information processing station 105).

Supplemental payment or transaction information processing station 105 may include, for instance, a workstation or workstations running the Microsoft Windows™ XP™ operating system, Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

Data and information maintained by supplemental payment or transaction information processing station 105 may be stored and cataloged in database 112 which may comprise or interface with a searchable database. Database 112 may comprise, include or interface to a relational database. Other databases, such as a query format database, a Standard Query Language (SQL) format database, a storage area network (SAN), or another similar data storage device, query format, platform or resource may be used. Database 112 may comprise a single database or a collection of databases, dedicated or otherwise. In one embodiment, database 112 may store or cooperate with other databases to store the various data and information described herein. In some embodiments, database 112 may comprise a file management system, program or application for storing and maintaining data and information used or generated by the various features and functions of the systems and methods described herein. In some embodiments, database 112 may store, maintain and permit access to customer information, transaction information, account information, and general information used to provide supplemental payment or transaction information as described herein. In some embodiments, database 112 is connected directly to supplemental payment or transaction information processing station 105, which, in some embodiments, it is accessible through a network, such as communication network 107, for example.

Supplemental payment or transaction information processing station 105 may, in some embodiments, be accessed via a communication network 107. Communications network 107 may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection.

Communications network 107 may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 107 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network 107 may comprise a satellite communications network, such as a direct broadcast communication system (DBS) having the requisite number of dishes, satellites and transmitter/receiver boxes, for example. Communications network 107 may also comprise a telephone communications network, such as the Public Switched Telephone Network (PSTN). In another embodiment, communication network 120 may comprise a Personal Branch Exchange (PBX), which may further connect to the PSTN.

As shown in FIG. 1, payor station 110 and payee station 115 may communicate with supplemental payment or transaction information processing station 105 via communication network 107. Payor station 110 may comprise an engine or station or network associated with an individual or entity that is posting a payment or other transaction to an account of a payee, such as, for example, a customer or employee of payor. For example, payor station 110 may comprise an engine, station or network that processes customer transactions with a particular merchant or merchant(s) and generates particulars associated with those transactions, such as, for example, the amount and date of a given transaction and the identity of the merchant, or the amount of a deposit being posted to an employee's account. In some embodiments, payor station 110 may comprise or interact with systems that generate or transmit payments files (e.g., ACH payment files) that are used to direct the posting of payments and other deposits to any number of accounts. In some embodiments, payor station 110 may comprise, for example, a station utilized by an agent of an individual or entity (e.g., a merchant) to interact or communicate with its customers or supplemental payment or transaction information processing station 105 to provide supplemental payment or transaction information. In some embodiments, payor station 110 may comprise a point-of-sale system or engine that processes transactions with an account holder and which may further cooperate or interact with external systems, for example, to carry out payment, deposit and other account transactions, including without limitation, for example, supplemental payment or transaction information processing station 105. As used herein, the term payor may refer to any person or entity (or agent thereof) that may take part in a transaction with an account holder, or correspond with an account holder in connection with any transaction. For example, a payor may comprise without limitation an employer, a merchant, a bank or other financial institution, buyer, individual, government entity, organization, association, or any individual or entity that may make a payment or otherwise provide funds or other value, for example. In some embodiments, a payor may be an individual or entity that may need to transmit information to a recipient, even if no payment is involved.

Payee station 115 may, in some embodiments, enable a payee, or any other person or entity that may utilize the systems and methods described herein to interact and communicate with a payor/provider as represented by payor station 110, for example, or with supplemental payment or transaction information processing station 105 in connection with the various features and functionality described herein. For example, payee station 115 may enable account holder to call or access a web site or page of a payor/provider, for example, to view account statements, or to communicate with supplemental payment or transaction information processing station 105. As used herein, the term payee may refer to any person or entity (or agent thereof) that may take part in a transaction. For example, a payee may comprise without limitation an account holder or cardholder which enters into transactions with an account or card, or which debits an account or received payments or deposits from any individual or entity, such as, for example, an employer, a merchant, or a bank or other financial institution, for example. In some embodiments, a payee may comprise any cardholder, account holder, recipient, benefit recipients, authorized participant, representative, payee, custodian, guardian, or any other individual or entity that may receive or provide supplemental information as described herein.

In some embodiments, payee station 115 may comprise any terminal (e.g., a typical home or personal computer system, telephone, personal digital assistant (PDA) or other like device) whereby a user (e.g., individual or entity) may interact with a network, such as communications network 107, for example, that is responsible for transmitting and delivering data and information used by the various systems and methods described herein. Payee station 115 may comprise or include, for instance, a personal or laptop computer, a telephone, PDA, or any terminal or device through which a payee may interact or interface. Payee station 115 may include a microprocessor, a microcontroller or other general or special purpose device operating under programmed control. Payee station 115 may further include an electronic memory such as a random access memory (RAM) or electronically programmable read only memory (EPROM), a storage such as a hard drive, a DVD, CDROM or a rewritable CDROM or another magnetic, optical or other media, and other associated components connected over an electronic bus, as will be appreciated by persons skilled in the art. Payee station 115 may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). Payee station 115 may also include a network-enabled appliance, a browser-equipped or other network-enabled cellular telephone, or another TCP/IP client or other device.

Figure 2A:
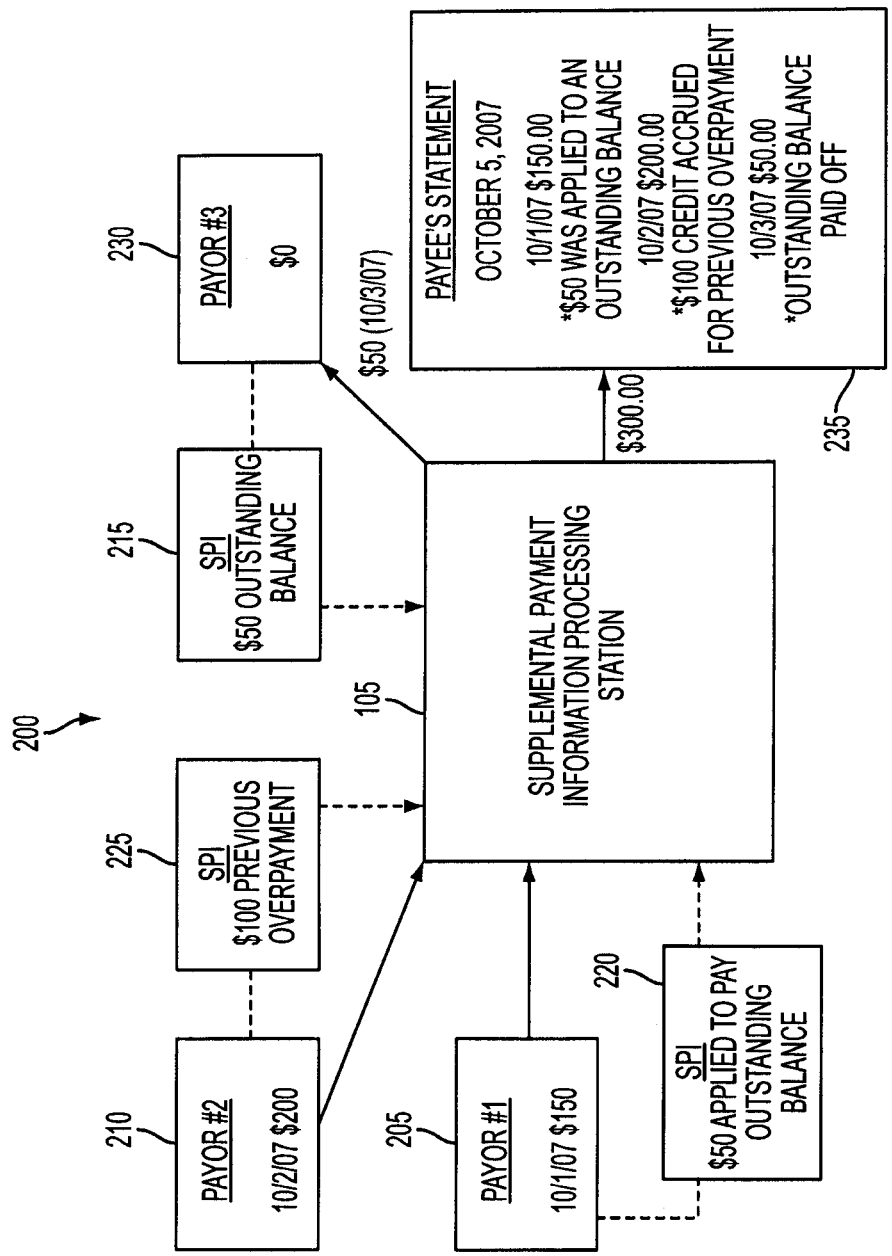
FIG. 2a illustrates a process flow 200 for providing supplemental payment or transaction information to a payee, according to various embodiments of the invention.

FIG. 2a illustrates a process flow 200 for providing supplemental payment or transaction information to a payee, according to various embodiments of the invention. As shown, at 205 payor #1 may post $150.00 dollars to a particular payee on Oct. 17, 2007. In some embodiments, payor #1 may transmit this payment information to supplemental payment information processing station 105 for generation of a statement. As shown in 220, payor #1 may also inform supplemental payment information processing station 105 that $50 originally owed to the payee was applied to pay a pre-existing outstanding balance. In some embodiments, the SPI may be provided along with the $150 payment information, while in some embodiments each is provided in a separate file. In some embodiments, payment information and SPI may be provided in bulk files or other notifications or transmissions that may be disaggregated by supplemental payment information processing station 105 according to payee or account. For example, in processing bulk payment files, such as ACH files, for example, supplemental payment information processing station 105 may allocate individual payments within the file to particular accounts or payees.

Next, at 210, payor #2 posts $200 to the payee's account on Oct. 2, 2007, and provides SPI indicating that an additional $100 was credited to the payee's account as a result of a recent overpayment, as shown in 225. Then, as shown in 215 and 230, even though payor #3 is not making a payment to the payee's account, payor #3 does transmit SPI indicating that the payee owes payor #3 $50 for a past transaction that remains due. In some embodiments, as is it does with payment information, supplemental payment information processing station 105 may associate SPIs it has received with particular accounts or payees.

Upon receiving payment and SPI from payors #1-3, supplemental payment information processing station 105 may proceed to generate a transaction statement to provide to the payee. In generating a statement 235 to present or make available to the payee, supplemental payment information processing station 105 may aggregate all payments that have been posted to the payee's account or name. Thus, as shown a total payment of $350 may be determined based on the $150 received from payor #1 and the $200 received from payor #2. After payments are allocated to accounts or payees, supplemental payment information processing station 105 may determine whether any portion of the total payment should be posted or transferred to another individual or entity, such as, for example, a provider to whom the payee may be in debt. In some embodiments, such a determination may be made based on SPI received from any individual or entity. Thus, SPI may provide detailed information regarding a particular payment or deposit, as well as information about money that may be owed by a particular payee or account holder to an individual or entity, such as a payer or provider. As shown in FIG. 2a, therefore, the payee is determined to be in debt to payor #3 for $50. In some embodiments, therefore, supplemental payment information processing station 105 may deduct $50 from the $350 total payment and post $300 to the payee's account and make payment to payor #3 on behalf of the payee for $50. In some embodiments, supplemental payment information processing station 105 may make payments on the payee's behalf so long as the payee has authorized it to do so.

In some embodiments, in generating statement 235, supplemental payment information processing station 105 may itemize each of the transactions on a daily basis and include any relevant and corresponding SPI. Thus, the entry for Oct. 1, 2007 may reflect a deposit of $150 with an explanation that $50 was applied to a previous outstanding balance owed to payor #1. The entry for Oct. 2, 2007 may reflect a $200 deposit with an explanation that a previous overpayment of $100 was being credited to the account. Lastly, for Oct. 3, 2007, the statement may reflect a payment of $50 to pay off an outstanding balance of $50 to payor #3. Once composed, statement 235 may be provided or made available to the payee, either electronically or in hardcopy format.

Figure 2B:
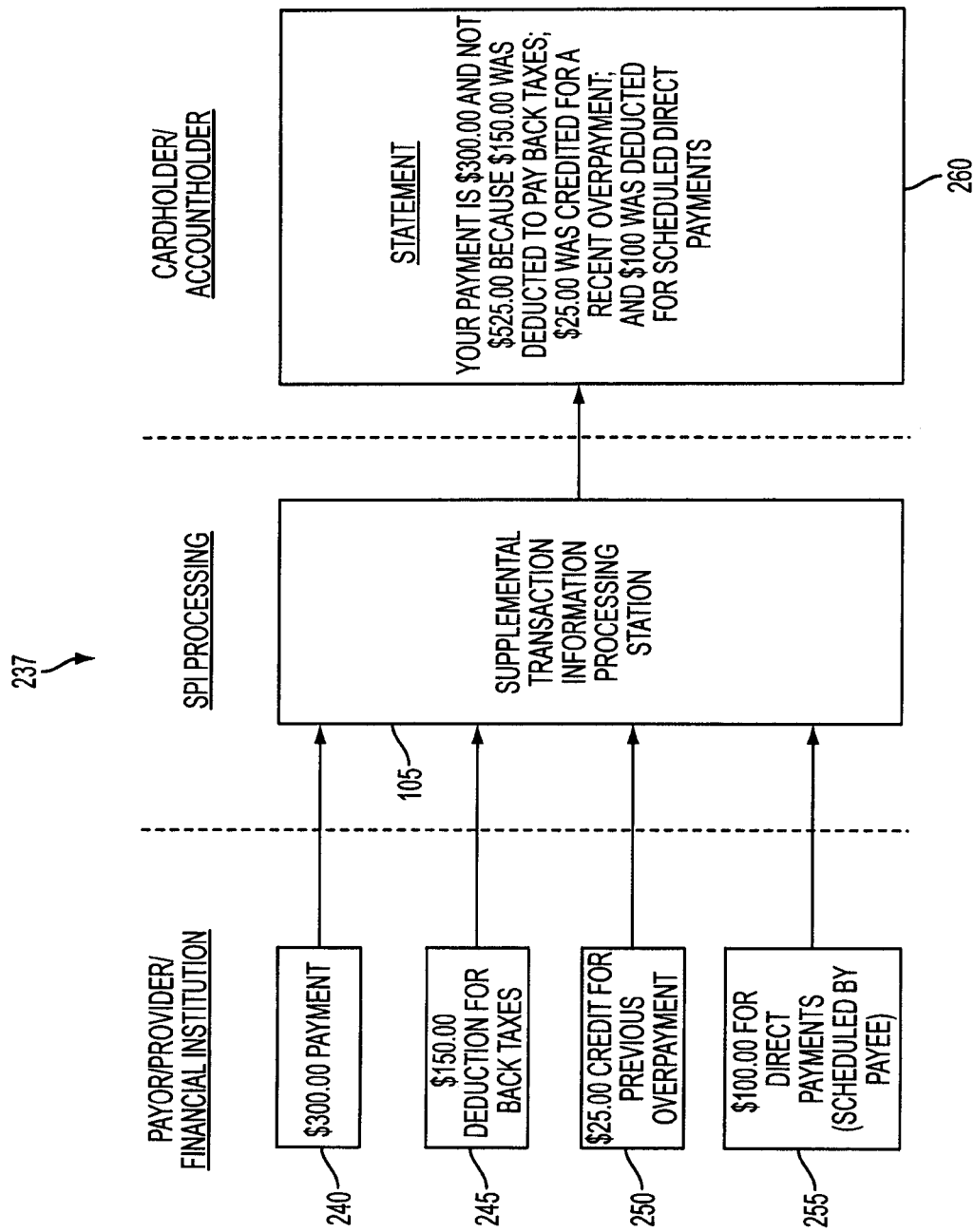
FIG. 2b illustrates a process flow 237 for providing supplemental payment or transaction information to a payee, according to various embodiments of the invention.

FIG. 2b illustrates a process flow 237 for providing supplemental payment or transaction information to a payee, according to various embodiments of the invention. As shown, there are three categories of participants: (1) a payor/provider/financial institution, (2) supplemental payment information processing station 105, and (3) a cardholder or account holder. As shown, the payor/provider/financial institution may provide supplemental payment information processing station 105 with transaction information 240 and SPI 245, 250 and 255. For example, if the payor/provider/financial institution is the cardholder or account holder's employer, then the transaction information 240 is a direct deposit paycheck and SPI 245, 250 and 255 provide explanations on the amount being deposited.

Upon receiving the transaction information, supplemental payment information processing station 105 may identify the appropriate account and/or cardholder and generate a statement 260 which includes an explanation of the amount being deposited. In some embodiments, statement 260 may be provided or made available to the cardholder or account holder in hardcopy format or electronically, such as over a communications network. As shown in 260, the statement explains that the expected payment of $525 was less because of a deduction for past taxes, a credit for a recent overpayment, and a deduction for authorized direct payments.

As shown in FIG. 2b, transaction information 240 and SPIs 245, 250 and 255 are all received from a single payor/provider. However, in some embodiments, supplemental payment information processing station 105 may reconcile transaction information and SPIs received from any number of payors/providers/financial institutions, and perform any necessary credits, debits or payments against the cardholder or account holder's account. For example, supplemental payment information processing station 105 may receive a payment of $525 from the employer, receive SPI 245 from a government agency, SPI 250 from a merchant, and SPI 255 based on predetermined cardholder or account holder preferences. Supplemental payment information processing station 105 may then reconcile the information received and post $300 to the cardholder or account holder's account (includes $25 credit), pay $150 to the government agency on behalf of the cardholder or account holder, and pay the appropriate merchants the $100 authorized payment.

Figure 3A:
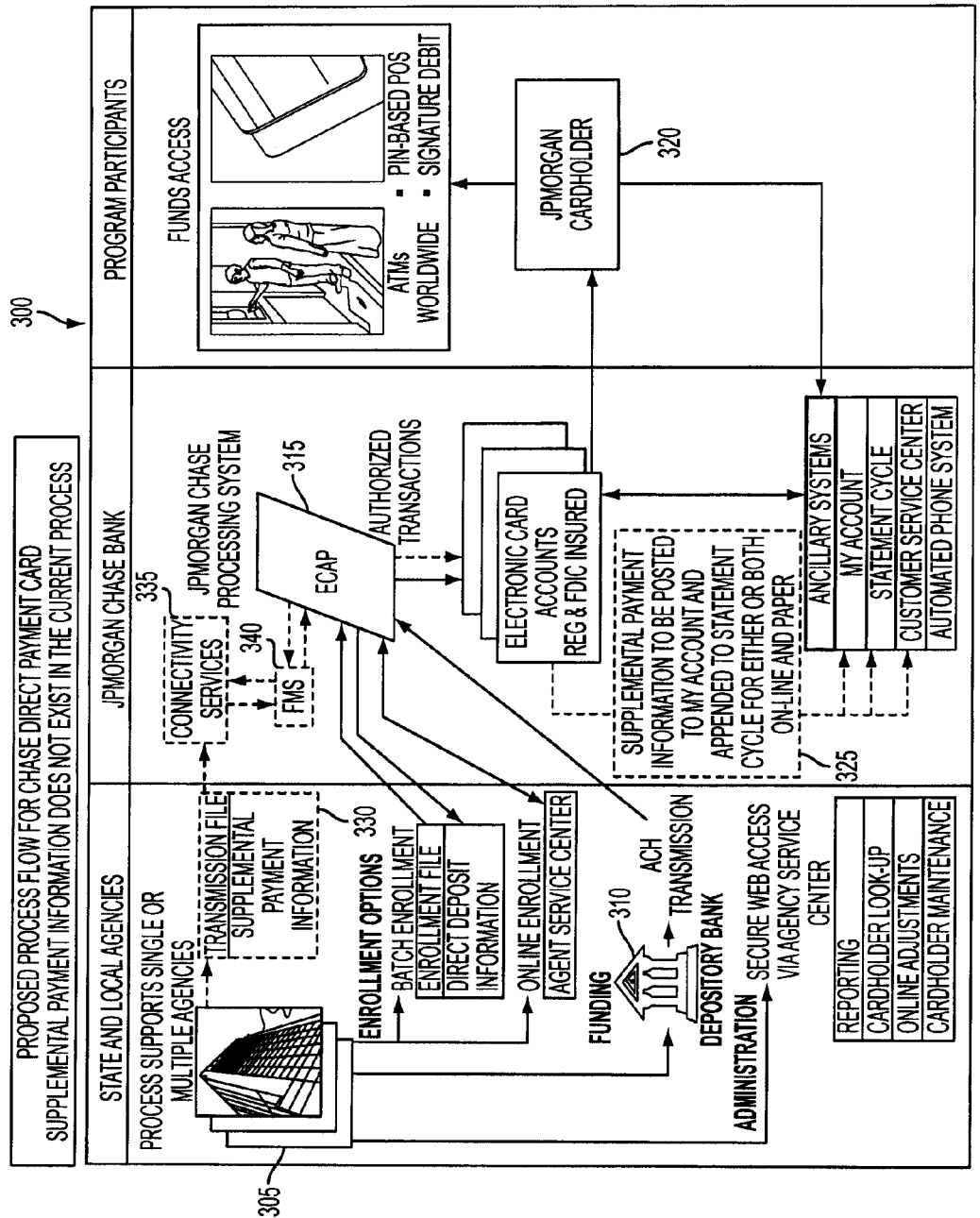
FIG. 3a illustrates an exemplary system 300 for providing supplemental payment or transaction information relating to any number of account, according to various embodiments of the invention.

FIG. 3a illustrates an exemplary system 300 for providing supplemental payment or transaction information relating to any number of account(s), according to various embodiments of the invention. As shown, the various systems and methods described herein receive supplemental information 330 from any number of individuals or entities (e.g., state or local agencies) 305. In addition, agencies 305 may also transmit payment files 310 (e.g., ACH files) corresponding to funds transmitted to corresponding cardholders 320. In some embodiments, the supplemental payment information 330 are received by processing system 315 via connectivity services 335 and FMS 340, while the ACH files 310 may be received directly from the depository bank, as shown. Connectivity services 335 and FMS 340 may, in some embodiments, comprise channels or gateways into or out of the bank for all data transmissions. In some embodiments, processing system 315 may comprise supplemental payment information processing station 105. Processing system 315 may then associate supplement information 330 with corresponding ACH files 310 and accounts 325. Next, processing system 315 may make the supplemental information 330 available to the appropriate cardholders 320.

Figure 3B:
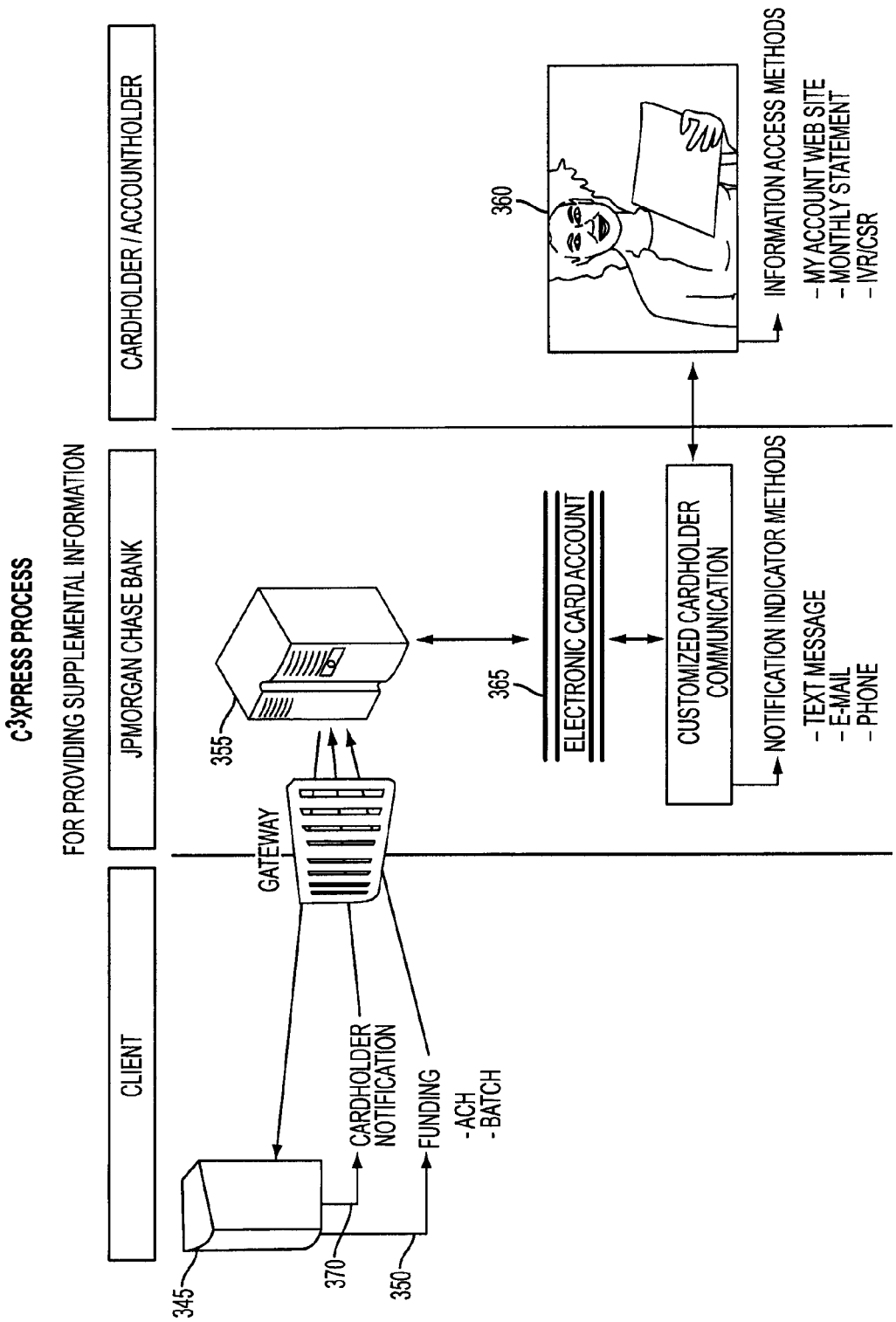
FIG. 3b illustrates an exemplary system for providing supplemental payment or transaction information relating to any number of account, according to various embodiments of the invention.

FIG. 3b depicts an embodiment of a process flow (e.g., $C^3Xpress$) for providing supplemental information. As shown, the interaction is between a client (e.g., the state or local agency in FIG. 2a.), the bank, and the cardholder or accountholder. A client 345 may comprise any individual or entity that may desire to offer the supplemental information features and functionality described herein. As shown, a client 345 may provide various features and functionality, such as, for example, funding functionality 350 (e.g., ACH and batch) and cardholder notification functionality 370 through or via an eCap system 355, which in some embodiments may comprise supplemental payment information processing station 105. Communications between eCap system 355 and client 345 may occur over a communications network and a gateway, as shown. Client may 345 may also transmit payment or other transaction information (and supplemental information related thereto) via ACH, batch, or other type of financial transactions as shown in 350. For example, client 345 may provide supplemental information relating to a financial transaction, such as, for example, a payment, deposit, withdrawal, or any other transaction to which supplemental information may be associated. Supplemental information may also comprise information that does not relate to financial or transaction information. In some embodiments, client 345 may offer cardholder notifications 370 through eCap system 355.

eCap system 355 may then receive transaction information and supplemental information from client 345 and organize and present such information to a cardholder or accountholder 360. In some embodiments, supplemental information may originate at eCap system 355, such as from the bank or other third party, for example. In some embodiments, for example, incoming transaction information and supplemental information may be associated with an electronic account 365 which is itself associated with a cardholder or accountholder 360. In some embodiments, the cardholder or accountholder may receive transaction information and associated supplemental information as well as notifications through an interface that is associated with eCap system 355. Such interface may provide the cardholder or accountholder with an account web site, a statement, IVR/CSR access, text messaging, email, or telephone access. In some embodiments, supplemental information that is associated with transaction information coming from client 345 may originate with client 330, eCap system 355, or some other third party.

In some embodiments, upon receiving supplemental information from the systems and methods described herein, a cardholder or accountholder 360 may transmit information or communications back to client 345, eCap system 355 (the Bank), or some other third party using the systems and methods described herein. For example, assume the supplemental information provided to cardholder or accountholder 360 relates to a particular event taking place in the cardholder or accountholder 360 hometown that requires prior registration. The systems and methods described herein may enable the cardholder or accountholder 360 to register for the event by providing registration information to client 345 or the appropriate third party through eCap system 355. Thus, the bidirectional arrows connecting eCap 355 system and the cardholder or accountholder 360 demonstrate the ability of information to flow from eCap system 355 to the cardholder or accountholder 360 and from cardholder or accountholder 360 to eCap system 355. Information received from the cardholder or accountholder 360 may then be transmitted by eCap system 355 to client 345, as shown by the arrow.

Figure 3C:
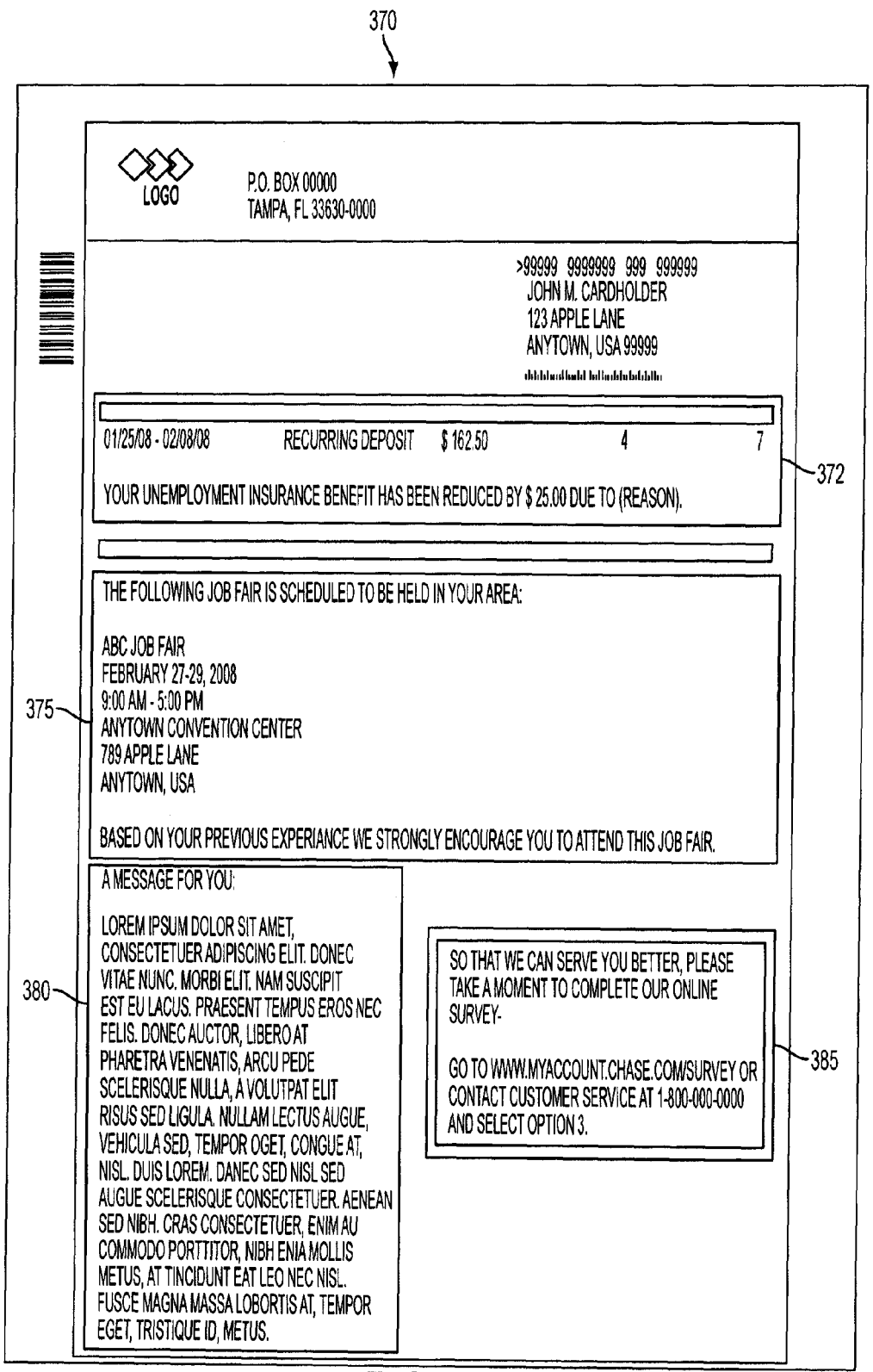
FIG. 3c illustrates a exemplary statement or notification providing supplemental payment information, according to various embodiments of the invention.

FIG. 3c illustrates one embodiments of a statement 370 that may be presented by the systems and methods described herein. As shown, a cardholder named John M. Cardholder is notified that for the week ending Feb. 8, 2008, a net amount of $162.50 was deposited into his account. This amount includes a deduction of $25.00 from his usual benefit amount of $187.50. In some embodiments, the $162.50 may be transaction information that is received from a client, such as client 345 in FIG. 3b, for example. The $25.00 deduction and the notification 375 stating "Your unemployment insurance benefit has been reduced by a $25.00 due to (reason)" may comprise supplemental information that is received from client 345 or which originates in eCap system 355 or other third party. Regardless of where the supplemental information originates, eCap system 355 may associate the supplemental information with incoming transaction information and present such information to an individual, entity or account via a communication or other notification, such as statement 370, for example.

Statement 370 may also include additional supplemental in the form of special announcement 375 informing the cardholder of an upcoming job fair. In some embodiments, announcement 375 is presented to the cardholder because eCap system 355 is aware (based on the incoming unemployment insurance payment from client 345) that the cardholder is unemployed. Other types of supplemental information may be maintained or accessed by transaction processing station 340 and presented to cardholders or accountholders as appropriate. In addition, eCap system 355 may also provide supplemental information that is particular to the cardholder, such as, for example, a personalized message 380, as well as other information that may be generally presented to some if not all cardholders, such as notification 385, for example. In some embodiments, therefore, eCap system 355 may provide supplemental information that is based on some attribute of the cardholder (e.g., announcement 375 is delivered because the cardholder is unemployed), as well as the precise identity of the cardholder (e.g., personalized message 380). In some embodiments, eCap system 355 may also provide a communications channel between the cardholder and itself, client 345 or any other third party. For example, eCap system 355 may receive survey responses from the cardholder by instructing the cardholder to visit a particular web site or call a telephone number. The cardholder's responses may then be processed by eCap system 355 or provided to client 345 or other third party as may be appropriate. Of course, eCap system 355 may receive information from the cardholder through other communication channels.

Figure 4:
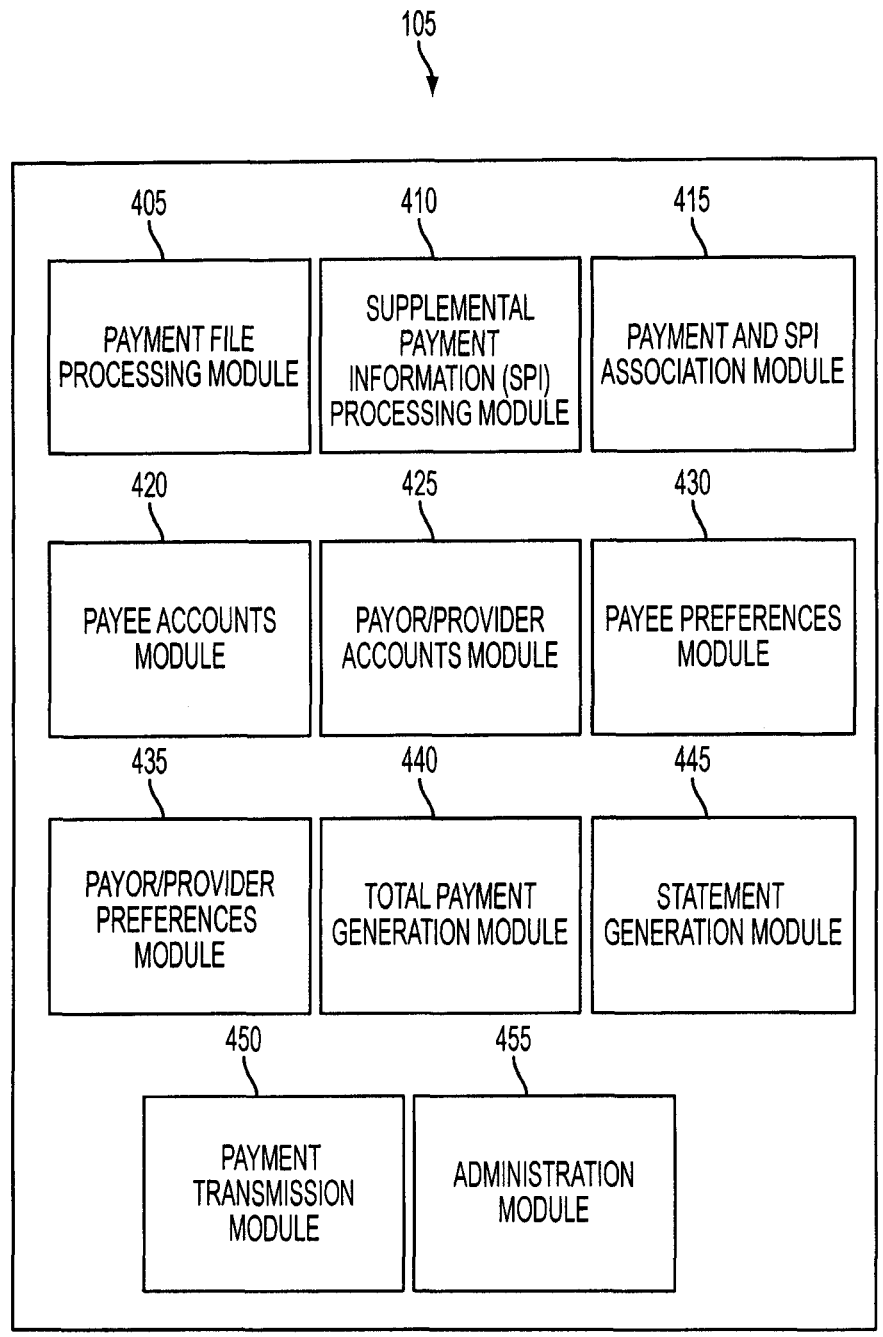
FIG. 4 illustrates various exemplary modules that may be associated with supplemental payment or transaction information processing station 105, according to various embodiments of the invention.

FIG. 4 illustrates exemplary modules that may be associated with supplemental payment or transaction information processing station 105 for carrying out (or administering) the various functions and features of the embodiments described herein. Other features and functionality are of course possible. While the modules may not be used in all embodiments to perform some or all of the functions of the present invention, they are nonetheless presented as possible embodiments:

Payment/transaction file processing module 405 may, in some embodiments, receive payment data and information from particular payors/providers (e.g., individuals, entities, merchants, financial institutions, or anyone that may provide transaction information or SPI.). For example, payment file processing module 405 may cooperate or interact with a payroll system, direct deposit system, funds transfer system, merchant or merchant acquiring system and/or a card processing system to receive particulars on transactions, such as date of transaction, name of merchant, cost of transaction, product or service purchased or sold (e.g., via a SKU, UPC or other identifier), amount of transaction, or any other data or information that may relate to a transaction. The data and information received through payment/transaction module 405 may be referenced or accessed by the various systems and methods described herein (including the other modules in FIG. 4) to carry out the features and functionality set forth herein, such as, for example, determining which account(s) a transaction or its particulars should be posted to.

Supplemental payment information (SPI) processing module 410 may, in some embodiments, receive SPIs from any number of individuals or entities. In some embodiments, SPIs may be received individually or in bulk, and may be associated with particular account(s) or account holder(s). For example, an SPI may be received from an employer regarding a recent payroll announcement that applies to all employees. Supplemental payment information processing station 105 may generate statements for each of these employees that are account holders and include the announcement as part thereof.

Payment and SPI association module 415 may, in some embodiments, associate transaction information with corresponding SPIs. For example, if an employer transaction corresponds to a direct deposit of an employee's paycheck, then payment and SPI association module 415 may identify and associate with the paycheck deposit any and all SPIs that correspond to the employee. As set forth above in FIGS. 2 and 2*a*, for example, such SPIs may explain the amount being deposited. In some embodiments, payment and SPI association module 415 may determine whether a discrepancy exists between a transaction and corresponding SPIs before including information in the SPIs on the account holder's statement. For example, if the transaction is a deposit of $525 and corresponding SPI indicates that the account holder is expecting a deposit $525, then payment and SPI association module 415 determine that SPI information to that effect in the statement to the account holder is not necessary.

Payee accounts module 420 may, in some embodiments, receive particulars from account holders relating to accounts to which payments may be made or transactions otherwise posted. For example, an account holder may provide account information in connection with the account to which payments made by supplemental payment or transaction information processing station 105 should be posted. In addition, an account holder may also provide any data or information required by supplemental payment or transaction information processing station 105 for the account holder to receive SPI according to the systems and methods described herein.

Payor/provider accounts module 425 may, in some embodiments, receive particulars on accounts to which payments may be made. For example, a merchant may provide account information in connection with the account to which payments made by supplemental payment or transaction information processing station 105 should be posted. In addition, a payor or provider may also provide any data or information required by supplemental payment or transaction information processing station 105 for the payor or provider to provide SPI according to the systems and methods described herein.

Payee preferences module 430 may, in some embodiments, receive account holder preferences regarding desired statement format and payment authorizations from account holders that receive SPI according to the systems and methods described herein. For example, an account holder may specify which individuals or entities may receive payments from supplemental payment or transaction information processing station 105. Likewise, an account holder may specify a ranked ordering of merchants that supplemental payment or transaction information processing station 105 may use to allocate payments. Other preference schemes are possible.

Payor/provider preferences module 435 may, in some embodiments, receive payor/provider preferences regarding desired statement/SPI format. For example, a payor/provider may specify a preference for line itemizations as reflected in FIG. 2*a*, or for a more narrative presentation as illustrated in FIG. 2*b*. Other preference schemes are possible.

Total payment generation module 440 may, in some embodiments, aggregate all transaction information and SPIs received for an account(s) or account holder(s) and determine a total payment to be posted thereto. As shown in FIG. 2*a*, for example, a total payment of $300 was determined based on the all incoming transaction information and SPIs. In some embodiments, the total payment determination is made for an account holder, and/or for all appropriate individuals or entities. In some embodiments, total payment generation module 440 may cooperate with payment transmission module 450 to ensure proper transmission to the appropriate account(s).

Statement generation module 445 may, in some embodiments, generate statements for account holders that include SPI along with corresponding transaction information. In some embodiments, statements may be configured based on account holder or payor/provider preferences. In some embodiments, a statement may be provided or made available electronically or in hardcopy form, such as, for example.

Payment transmission module 450 may, in some embodiments, transmit and post payments, deposits or other transactions to particular accounts. In some embodiments, payment processing module 450 may interact or cooperate with external payment processors associated with a bank or other individual or entity that administers accounts to which payments are posted as described herein.

Administration module 455 may, in some embodiments, enable an administrator of supplemental payment or transaction information processing station 105, for example, to interact with the various modules, features and functionality described herein. For example, an agent of supplemental payment or transaction information processing station 105 may interact with administration module 455 to input, revise and remove data and information used by the various systems and methods described herein, such as, for example, account or account holder information, transaction information, SPIs, payor, provider, employer, or merchant information, or any other data or information that may be used to perform the various features and functionality described herein. In some embodiments, administration module 455 may enable an administrator of supplemental payment or transaction information processing station 105 to establish parameters or rules associated with the various features and functionality described herein. For example, an administrator may establish limits, caps, delays, rules or fees associated with a customer's use of the features and functionality described herein. A customer may also be required to pay a fee to be able to be able to process transactions and select accounts as described herein. Such a fee may be, for example, annually or monthly imposed or may be charged on a one-time or per-transaction basis. In some embodiments, the fee may comprise a monetary amount or any other form of measurable value.

Figure 5:
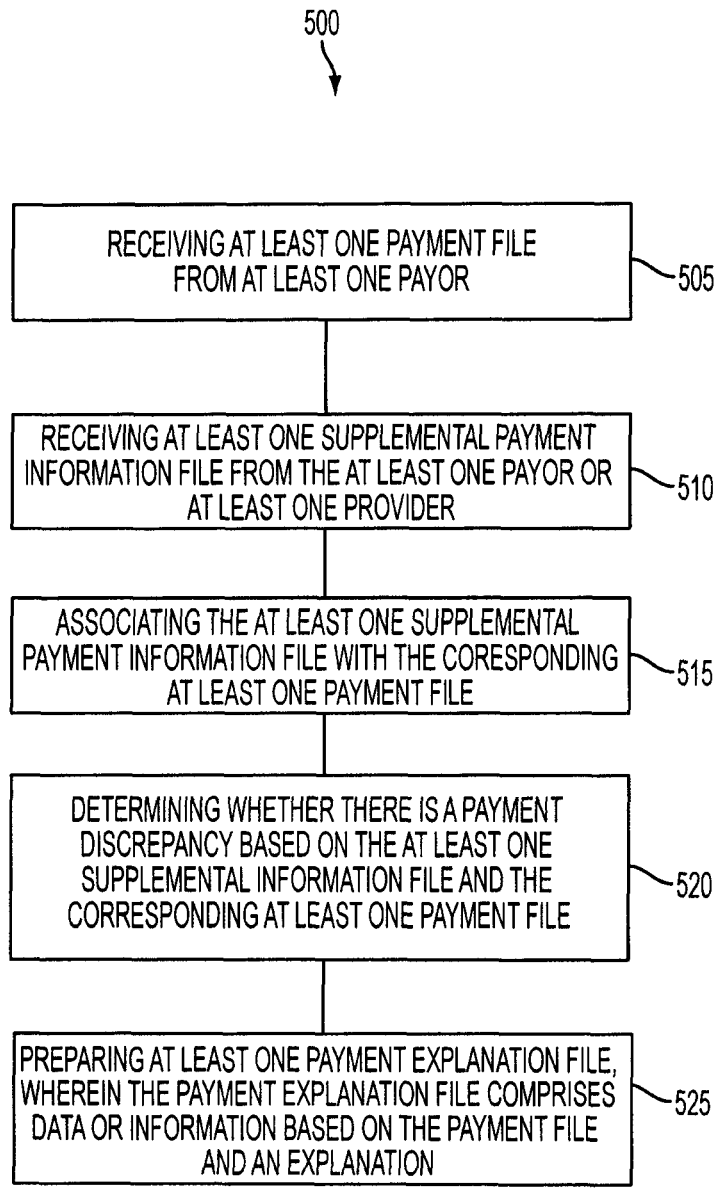
FIG. 5 illustrates a process flow 500 for providing supplemental payment or transaction information, according to various embodiments of the invention.

FIG. 5 illustrates a process flow 500 for providing supplemental payment or transaction information, according to various embodiments of the invention. At step 505, at least one payment file from at least one payor is received. At step 510, at least one supplemental payment information file from the at least one payor or at least one provider is received. At step 515, at least one supplemental payment information file is associating with a corresponding at least one payment file. At step 520, a determination is made whether there is a payment discrepancy based on the at least one supplemental information file and the corresponding at least one payment file. At step 525, at least one payment explanation file is prepared, wherein the at least one payment explanation file comprises data or information based on the payment file and an explanation.

Figure 6:
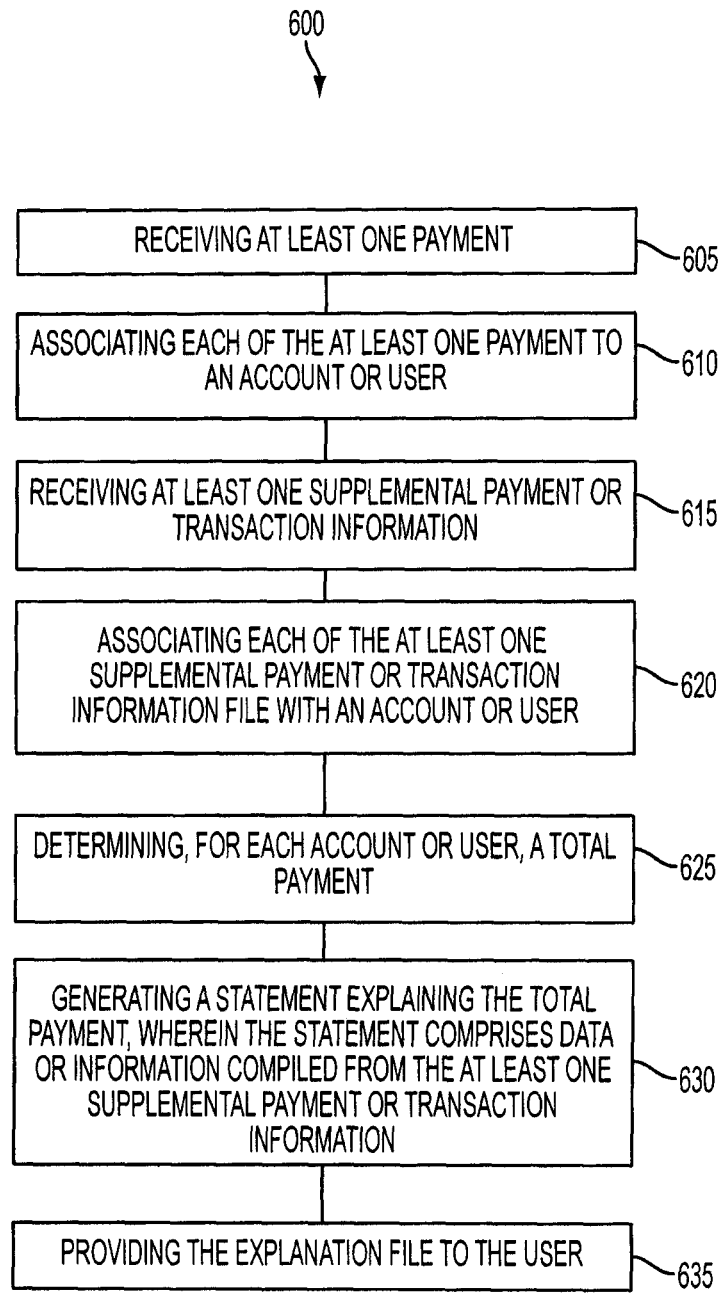
FIG. 6 illustrates a process flow 600 for providing supplemental payment or transaction information, according to various embodiments of the invention.

FIG. 6 illustrates a process flow 600 for providing supplemental payment or transaction information, according to various embodiments of the invention. At step 605, at least one payment is received. At step 610, each of the at least one payment is associated with an account or user. At step 615, at least one supplemental payment or transaction information is received. At step 620, each of the at least one supplemental payment or transaction information file is associated with an account or user. At step 625, a total payment is determined for each account or user. At step 630, a statement explaining the total payment is generated, wherein the statement comprises data or information compiled from the at least one supplemental payment or transaction information. At step 635, the statement is provided to the user.

Hereinafter, aspects of implementation of the invention will be described. As described above, FIG. 1 shows embodiments of a system of the invention. The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example. As described herein, a module performing functionality may comprise a processor and vice-versa.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

The embodiments of the present inventions are not to be limited in scope by the specific embodiments described herein. For example, although many of the embodiments disclosed herein have been described with reference to contribution of money, funds or other value (e.g., reward points) to a transactions device, the principles herein are equally applicable to the contribution of any type of benefit, reward or other value that may identified and contributed to a transactions device. In addition, although many of the embodiments disclosed herein have been described with reference to a savings and transactions processing station that is associated with an administrator of financial instrument or device programs, such as a bank, for example, it should be appreciated that various aspects of the invention may be accomplished when various system components are located elsewhere or administered by other individuals or entities. For instance, the supplemental payment or transaction information processing station 105 described herein may be maintained and administered by a third party service provider. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

What is claimed is:

1. A method for providing supplemental payment information, comprising:

receiving, using a payment processor, at least one payment file from at least one payor;

receiving, using a supplemental information processor, at least one supplemental payment information file from the at least one payor or at least one provider;

associating, using an association processor, the at least one supplemental payment information file with a corresponding at least one payment file and further identifying a corresponding account and a corresponding account holder; and determining, using a discrepancy determination processor, whether there is a payment discrepancy between the at least one supplemental payment information file and the corresponding at least one payment file;

preparing, using an explanation processor, at least one payment explanation file, wherein the payment explanation file comprises data or information based on the at least one supplemental payment information file and the corresponding at least one payment file and an explanation of the payment discrepancy; and providing, using the explanation processor, the explanation of the payment discrepancy to the account holder.

2. The method of claim 1 wherein the at least one payment file comprises at least one payment amount and at least one payment date.

3. The method of claim 1 wherein the at least one payment file comprises at least one automated clearinghouse (ACH) file.

4. The method of claim 1 wherein the at least one supplemental payment information comprises information corresponding to a payment or other transaction in the at least one payment file.

5. The method of claim 1 wherein the payment discrepancy comprises a difference between a payment information in the at least one supplemental payment information file and a payment or other transaction information in the at least one payment file.

6. The method of claim 1 wherein the at least one payment explanation file comprises an explanation of a payment difference between the supplemental payment information file and the at least one payment file.

7. The method of claim 1 wherein the at least one payment explanation file is accessible over a communications network.

8. The method of claim 1 wherein the at least one payment explanation file is associated with a statement.

9. The method of claim 8 wherein the statement is an electronic statement or a hardcopy paper statement.

10. The method of claim 1 further comprising the step of translating the supplemental information contained in the supplemental payment information file.

11. A system for providing supplemental payment information, comprising:
    a payment processor configured to receive at least one payment file from at least one payor;
    a supplemental information processor configured to receive at least one supplemental payment information file from the at least one payor or at least one provider;
    an association processor configured to associate the at least one supplemental payment information file with a corresponding at least one payment file and further configured to identify a corresponding account and a corresponding account holder;
    a discrepancy determination processor configured to determine whether there is a payment discrepancy based on the at least one supplemental information file and the corresponding at least one payment file; and
    an explanation processor configured to prepare at least one payment explanation file, wherein the payment explanation file comprises data or information based on the at least one supplemental information file and the corresponding at least one payment file and an explanation of the payment discrepancy and further configured to provide the explanation of the payment discrepancy to the account holder.

12. The system of claim 11 wherein the at least one payment file comprises at least one payment amount and at least one payment date.

13. The system of claim 11 wherein the at least one payment file comprises at least one automated clearinghouse (ACH) file.

14. The system of claim 11 wherein the at least one supplemental payment information comprises information corresponding to a payment or other transaction in the at least one payment file.

15. The system of claim 11 wherein the payment discrepancy comprises a difference between a payment information in the at least one supplemental payment information file and a payment or other transaction information in the at least one payment file.

16. A method for providing supplemental payment information, comprising:
    receiving, using a payment processor, at least one payment;
    associating, using an association processor, each of the at least one payment to an account or user;
    receiving, using a supplemental information processor, at least one supplemental payment or transaction information;
    associating, using an association processor, each of the at least one supplemental payment or transaction information file with the account or user;
    determining, using a discrepancy determination processor, for each account or user, a total payment based at least in part on the at least one supplemental payment or transaction information;
    generating, using an explanation processor, a statement explaining the total payment, wherein the statement comprises data or information compiled from the at least one supplemental payment or transaction information; and
    providing, using the explanation processor, the statement to the user.

17. The method of claim 16 wherein the at least one supplemental file is received from at least one payor or provider.

18. The method of claim 16 wherein the total payment comprises the sum of all payments corresponding to the account or user.

19. The method of claim 16 wherein the statement is provided to the user electronically.

20. The method of claim 16 wherein the statement is provided to the user in hardcopy format.

21. The method of claim 16 wherein the user accesses the statement over a communications network.

* * * * *